United States Patent
Sandofsky et al.

(10) Patent No.: US 11,516,402 B1
(45) Date of Patent: Nov. 29, 2022

(54) REALTIME IMAGE ANALYSIS AND FEEDBACK

(71) Applicant: Lux Optics Incorporated, San Mateo, CA (US)

(72) Inventors: Benjamin Keith Sandofsky, San Mateo, CA (US); Sebastiaan Anne Laurens de With, San Francisco, CA (US)

(73) Assignee: Lux Optics Incorporated, San Mateo, CA (US)

( * ) Notice: Subject to any disclaimer, the term of this patent is extended or adjusted under 35 U.S.C. 154(b) by 0 days.

(21) Appl. No.: 17/548,568

(22) Filed: Dec. 12, 2021

Related U.S. Application Data

(60) Provisional application No. 63/124,501, filed on Dec. 11, 2020.

(51) Int. Cl.
| | |
|---|---|
| G06T 1/20 | (2006.01) |
| G06T 3/40 | (2006.01) |
| H04N 5/232 | (2006.01) |
| G06T 11/20 | (2006.01) |

(52) U.S. Cl.
CPC ......... *H04N 5/232939* (2018.08); *G06T 1/20* (2013.01); *G06T 3/4015* (2013.01); *G06T 11/206* (2013.01); *H04N 5/23229* (2013.01); *H04N 5/232933* (2018.08)

(58) Field of Classification Search
CPC ......... H04N 5/232939; H04N 5/23229; H04N 5/232933; G06T 1/20; G06T 3/4015; G06T 11/206
See application file for complete search history.

(56) References Cited

U.S. PATENT DOCUMENTS

| | | | |
|---|---|---|---|
| 10,510,153 B1 * | 12/2019 | Gentles | ..................... G06T 7/44 |
| 2007/0189603 A1 * | 8/2007 | Kasperkiewicz | ..... G06T 3/4015 |
| | | | 382/162 |
| 2007/0269183 A1 * | 11/2007 | Choi | ........................ H04N 5/76 |
| | | | 386/335 |
| 2010/0195929 A1 * | 8/2010 | Inoue | .................. H04N 1/00453 |
| | | | 382/274 |
| 2019/0230253 A1 * | 7/2019 | Nikhara | ............... H04N 1/6027 |

OTHER PUBLICATIONS

Author Unknown, Gamma correction, Wikipedia, 2021.
Drago et al., Adaptive Logarithmic Mapping for Displaying High Contrast Scenes, Eurographics 2003, 2003, vol. 22, No. 3.
Hasinoff et al., Burst Photography for High Dynamic Range and Low-Light Imaging on Mobile Cameras, SA '16 Technical Papers, Dec. 2016.

* cited by examiner

*Primary Examiner* — Tapas Mazumder
(74) *Attorney, Agent, or Firm* — Van Pelt, Yi & James LLP

(57) ABSTRACT

Performing realtime image analysis and providing realtime feedback are disclosed. A stream comprising a plurality of arriving RAW images is received. A RAW image included in the stream is sent to a graphics processing unit (GPU). A result of the GPU is used to generate a visualization corresponding to the RAW image. The visualization is co-presented with a realtime view of a scene in a display.

25 Claims, 19 Drawing Sheets

REALTIME IMAGE ANALYSIS AND FEEDBACK

CROSS REFERENCE TO OTHER APPLICATIONS

This application claims priority to U.S. Provisional Patent Application No. 63/124,501 entitled XDR ANALYSIS filed Dec. 11, 2020 which is incorporated herein by reference for all purposes.

BACKGROUND OF THE INVENTION

Multipurpose mobile or other devices (e.g., smart phones and tablets) are increasingly being used to capture content as contrasted with traditional, dedicated photographic/audiovisual equipment. One reason for this shift in usage is that mobile devices are virtually ubiquitous (with individuals likely always having such a device available). Another reason is that, as sensor and other technology has improved, the image quality of such devices is now generally considered to rival content captured using traditional equipment. Indeed, the processing power and/or other technical capabilities of multipurpose devices now sometimes exceed that provided by traditional, dedicated equipment. Unfortunately, both multipurpose devices and traditional, dedicated equipment have finite processing capabilities. Accordingly, improvements in efficiently using those processing capabilities continue to be needed.

BRIEF DESCRIPTION OF THE DRAWINGS

Various embodiments of the invention are disclosed in the following detailed description and the accompanying drawings.

DETAILED DESCRIPTION

Figure 1:
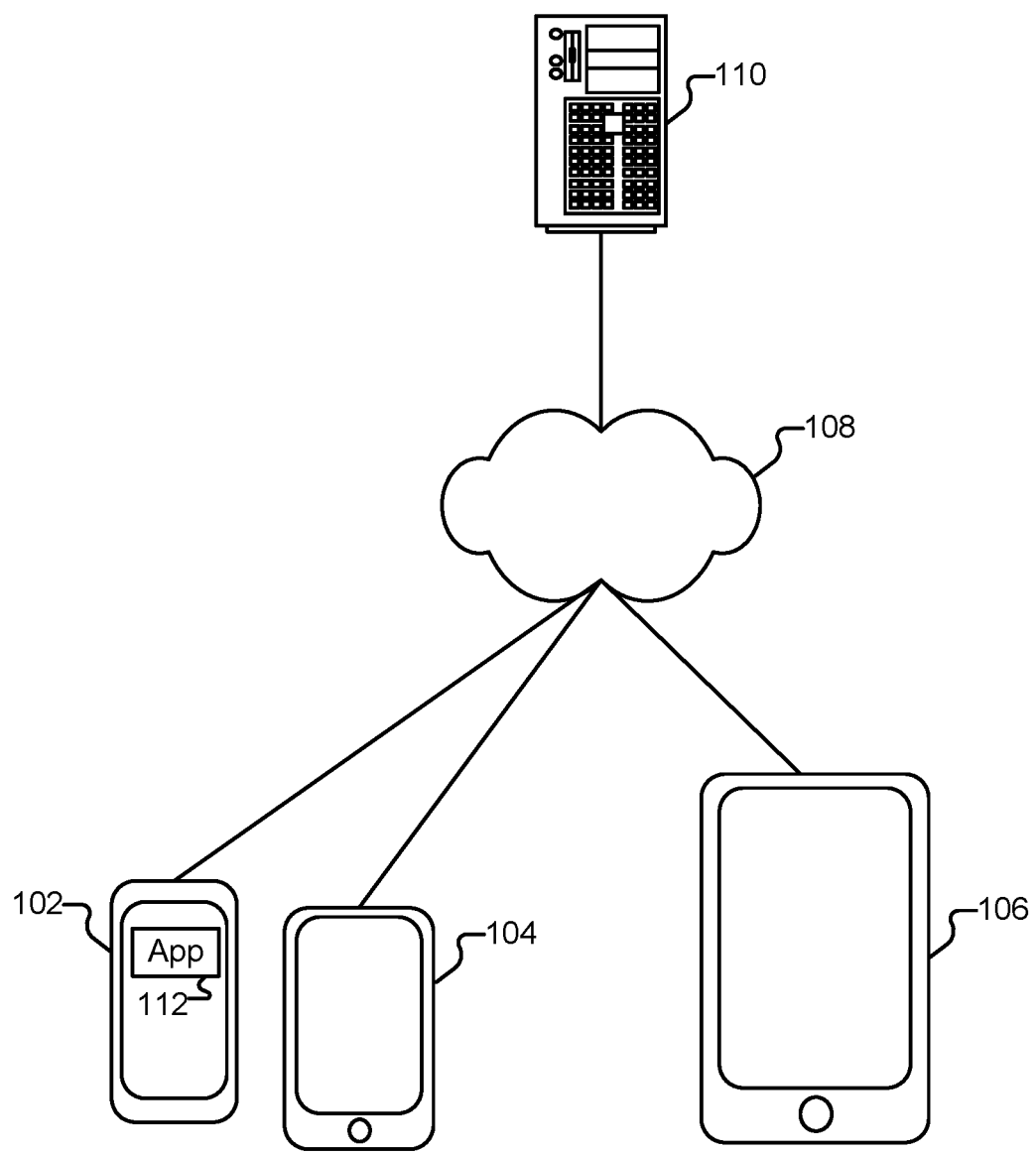
FIG. 1 illustrates an example of an environment in which a variety of mobile devices are configured to create long exposure images.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Generating Long Exposure Images

A. Introduction

Often, when a photographer takes a photograph, the intent is to capture sharp subject details (and freeze any motion occurring in the scene). In order to achieve such a result (e.g., under typical daylight lighting conditions), a short exposure (e.g., $\frac{1}{30}^{th}$ or $\frac{1}{100}^{th}$ of a second) is used. Photographs captured over longer periods (e.g., multiple seconds or longer) are often referred to as "long exposure" photographs.

Long exposure photography can be desirable in a variety of contexts for a variety of reasons, including for practical and artistic effect purposes. In contrast with freezing action (e.g., capturing individual water droplets, pinpointing stars, or preserving athletic moments using a fast exposure), a photographer may instead wish to emphasize the movement of a subject (e.g., photographing a smooth flow of water or trail of stars) through the deliberate use of a blurring effect provided by a longer exposure. Another example use of long exposure photography is as a practical tool. The presence of unwanted transient elements in a scene (such as a stray car or person) can be mitigated through use of long exposure photography. Similarly, a better quality image (e.g., having less noise) can be obtained when pairing a longer exposure at a lower ISO setting than a faster exposure with a higher ISO setting.

One challenge in performing long exposure photography lies in holding the camera as still as possible during the exposure. Holding a camera still for $\frac{1}{30}^{th}$ or $\frac{1}{100}^{th}$ of a second is a relatively straightforward task for most individuals. Unfortunately, even for steady-handed individuals, small involuntary muscle movements are likely to occur during multi-second exposures that will cause unwanted camera motion during exposure. Traditionally, photographers have made use of clamps, tripods, and/or other physical mechanisms to help hold their cameras steady during a long exposure. In an increasingly mobile world, however, carrying around such additional equipment can be cumbersome and/or impractical. Described herein are techniques for creating long exposure imagery, including by an end user handholding a mobile device, which do not depend on the use of tripods or similar extraneous equipment (e.g., mounts).

The techniques described herein can be performed in realtime (i.e., as the scene is optically captured, as contrasted with photo manipulation techniques which operate on previously captured images). Further, feedback can be provided to the user, in realtime, during optical capture. The following are three example scenarios in which example end users may wish to engage in long exposure photography using commodity mobile devices. In each of the scenarios, the user may wish to capture a particular subject by itself, and/or may wish to incorporate themselves (e.g., in a selfie mode). Techniques described herein can also be used in other scenarios as well (e.g., to minimize noise in low light situations).

Scenario 1: Water features

A user may wish to photograph a water feature (e.g., a fountain, waterfall, stream, etc.). Using techniques described herein, the user can create an image in which moving water appears as silky smooth.

Scenario 2: Minimizing unwanted transient elements

A user visiting a popular tourist destination may wish to photograph a landmark (e.g., a statue or building). Using techniques described herein, the user can create an image that mitigates the presence of unwanted elements (e.g., other tourists, car traffic, etc.) obstructing the view of the landmark.

Scenario 3: Light Trails

A user may wish to create artistic images that incorporate fireworks, city lights, automotive lights, etc. Using techniques described herein, the user can create such images.

B. Example Environment and Mobile Device Embodiments

FIG. 1 illustrates an example of an environment in which a variety of mobile devices are configured to create long exposure images. As shown, client devices 102 and 104 are mobile telephony devices, and client device 106 is a tablet computing device. Each of client devices 102-106 executes an applicable operating system (e.g., Android or iOS) and facilitates imagery capture/creation via one or more on-device cameras. The techniques described herein can also be used in conjunction with other types of devices, such as gaming consoles, augmented reality devices, quadcopters/drones, observational systems, etc.

Image capture techniques described herein can be incorporated into client devices 102-106 in a variety of ways, including as native functionality and/or through the use of one or more third-party applications or application components (e.g., as obtainable via an applicable network such as network 108 from an applicable repository (e.g., app store 110, examples of which include Google Play, iOS App Store, Windows Store, and Amazon Appstore)).

Figure 2A:
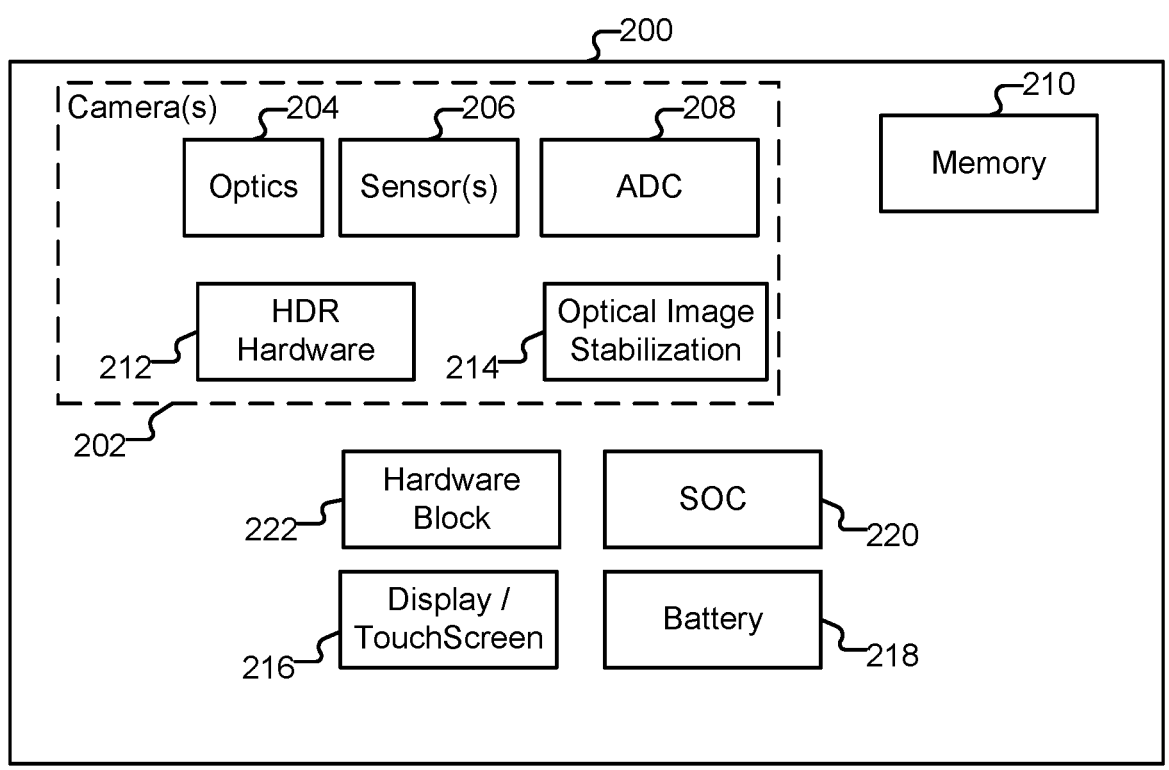
FIG. 2A illustrates example physical components that can be included in embodiments of a device that can be used in accordance with long exposure techniques described herein.

FIG. 2A illustrates example physical components that can be included in embodiments of a device that can be used in accordance with long exposure techniques described herein. Mobile device 200 includes a set of one or more cameras 202 which can comprise respective optics 204 (e.g., camera lenses), sensors 206, analog-to-digital converters 208, etc., in various embodiments. Due to hardware and other constraints (e.g., physical size, safety, and/or waterproofing considerations), camera 202 is limited in its ability to take exposures of up to four seconds. And, some embodiments of camera 202 may only support shorter exposures (e.g., of up to two seconds, or shorter). This is contrasted with traditional photographic equipment which often supports exposures of 30 seconds and longer.

In various embodiments, mobile device 200 includes additional hardware that can be used during the capture of imagery. Examples include HDR hardware 212 and optical image stabilization module 214, which may be present as additional components of cameras 202 and/or may be incorporated into other modules of mobile device 200 (e.g., as part of a system on chip 220 which can also incorporate CPU/GPU/RAM, etc.). Such additional hardware can be leveraged by techniques described herein (e.g., if present on a mobile device) but need not be provided by a mobile device in order to take advantage of techniques described herein. Additional hardware components that are included in embodiments of mobile device 200 include a touch screen 216 and one or more batteries 218.

Imagery captured by camera 202 is provided to memory 210 which is managed by device 200's operating system and mapped to buffers that are handled through frameworks (and can be accessed by application calls, etc., as applicable). Memory 210 can be included within camera 202, provided by SOC 220, or otherwise provided on mobile device 200, including as multiple memories (e.g., due to optimizations). Hardware block 222 can perform realtime image subsampling, e.g., for realtime encoding.

Figure 2B:
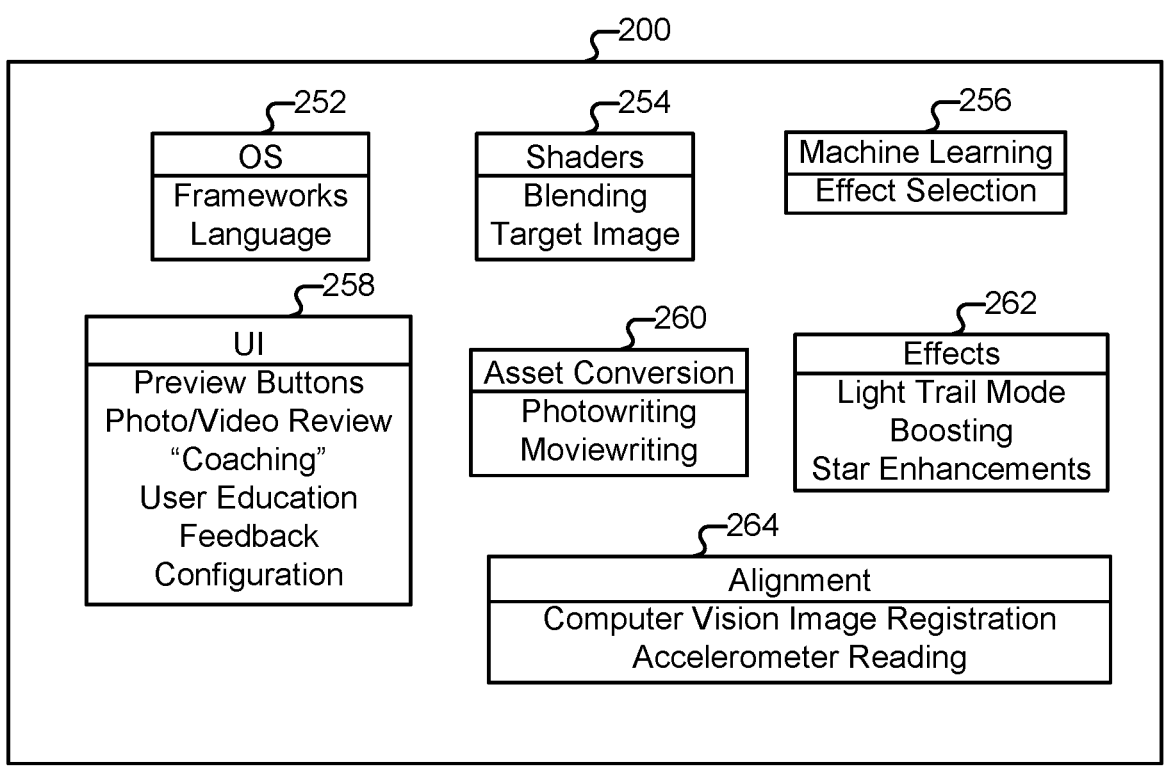
FIG. 2B illustrates example functional/logical components that can be included in embodiments of a device that can be used in accordance with long exposure techniques described herein.

FIG. 2B illustrates example functional/logical components that can be included in embodiments of a device that can be used in accordance with long exposure techniques described herein. Such components of mobile device 200 are generally implementable in a variety of ways, including as a set of one or more scripts (e.g., written in Java, python, etc., as applicable), libraries, application programming interfaces (APIs), modules, etc. Mobile device 200's operating system 252 (e.g., iOS or Android) makes available a set of frameworks which provide for use of/access to various functionality provided by hardware components of mobile device 200. GPU shaders 254 can be written to communicate with such frameworks. Such shaders can be used to generate photographs and also to provide realtime renderings (e.g., via display 216) for preview during photograph creation. Asset conversion system 260 provides functionality for reading and writing photo and movie media and for converting assets. Alignment component 264 provides functionality (e.g., computer vision image registration and/or motion sensor readings) for aligning image frames with a registration image and also providing motion feedback. User interface module 258 provides support for features such as interactive buttons, realtime image previews, user coaching tips/tutorials, etc.

Machine learning module 256 can be used to recommend particular effects/configurations (262) for capturing different kinds of long exposure images. One way to generate such recommendations is to use, as training data (e.g., for a neural network), various example images (e.g., waterfall training imagery, night sky training imagery, fireworks training imagery, selfie portraits with light trails, etc.). While executing application 112, a current context for the long exposure image to be captured can be obtained (e.g., by performing computer vision analysis on an initial frame) and compared against available models to make a recommendation. Such recommendations can include configurations (e.g., frame rate, exposure time, etc.) and artistic choices (e.g., which type of blending mode to use (e.g., averaging)), whether to apply an additional effect (e.g., boosting highlight clipped values), etc.

Functionality described herein as being performed by embodiments of mobile device 200 (e.g., when operated at the direction of an end user hereinafter referred to as "Alice") can be provided/implemented in a variety of ways. Whenever mobile device 200 is described herein as performing a task, a single component, a subset of components, or multiple components of mobile device 200 may cooperate to perform the task. Similarly, whenever a component of mobile device 200 is described herein as performing a task, a subcomponent may perform the task and/or the component may perform the task in conjunction with other components. Further, mobile device 200 can take a variety of forms and, depending on specific implementation, various components and/or features of device 102 may be omitted, provided by other components, and/or and the techniques described herein adapted accordingly. Similarly, additional components/features (not depicted in FIGS. 2A/2B) can be included in embodiments of mobile device 200 as applicable.

C. Multi-Phase Processing

Figure 3:
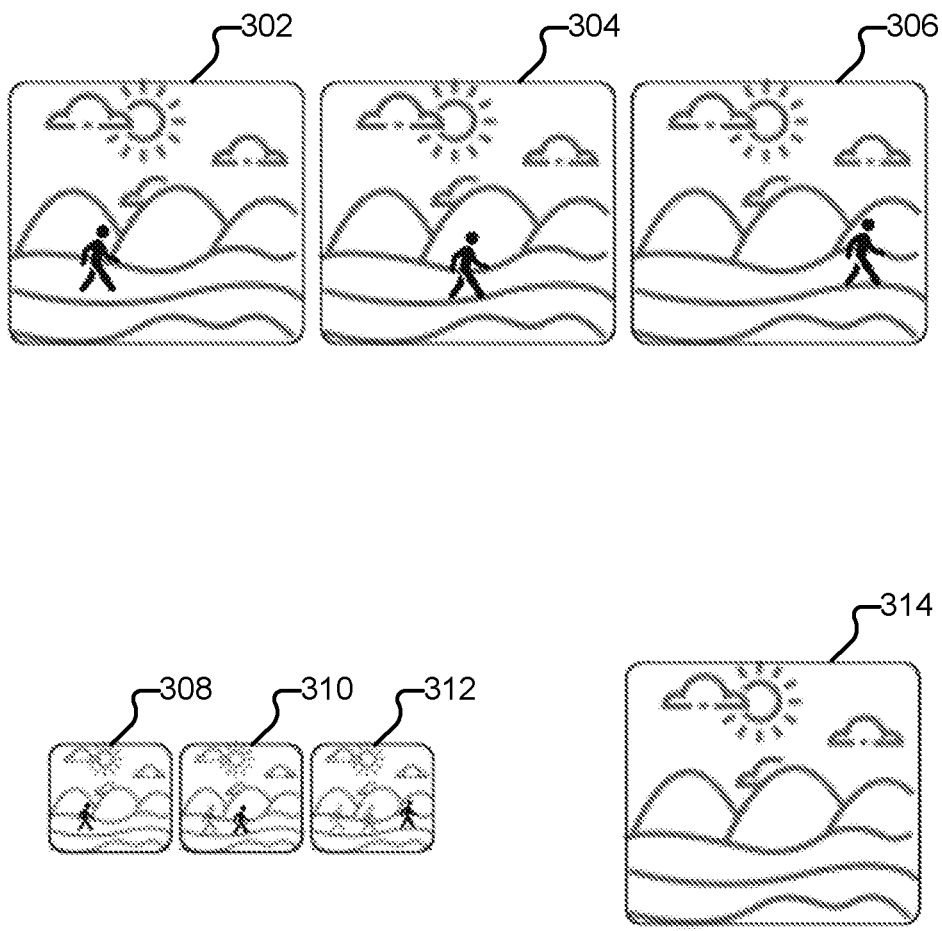
FIG. 3 illustrates the assembly of a set of frames into a long exposure image.

As will be described in more detail below, a single long exposure image can be efficiently created, in realtime, from a series of several individual images. Creation of the long exposure image can occur as a result of three processing phases, each of which can be performed in parallel (including during the capturing of image data) for efficiency. Suppose a user (Bob) would like to capture a long exposure view of a mountain scene on mobile device 104. Unfortunately, another individual (Charlie) is walking through the scene that Bob would like to capture. By blending multiple short exposures together, Bob will be able to capture the scene while minimizing Charlie's presence. A simplified example is shown in FIG. 3. A series of frames 302-306 depict the mountain scene that Bob would like to capture, as well as Charlie walking through the scene. Each of the frames represents a snapshot in time of the scene, as Charlie happens to walk through it, and can be individually processed and blended together, in realtime, into a single long exposure image. As will be described in more detail below, as each frame arrives (e.g., with frame 304 arriving after frame 302), it can be processed and blended into a result of the previously blended frames. In a simplified example, suppose only a total of three frames (frames 302-306) is captured. Region 308 depicts a blended long exposure after frame 302 has arrived and been processed. Region 310 depicts a blended long exposure after frame 304 has arrived and been processed. Region 312 depicts a blended long exposure after frame 306 has arrived and been processed. Note that in region 308 (where the blended image comprises only frame 302) Charlie is prominent, however, as additional frames are processed (e.g., as frames 304 and 306 are received and processed), Charlie's presence in the long exposure appears to ghost. In a long exposure blending frames 302-306 together, aspects common to all frames (e.g., the mountains and clouds) will appear more strongly than dynamic elements (which will fade out). Given enough frames (e.g., 90 frames instead of the example 3 frames), the presence of Charlie during filming will be mitigated (e.g., as shown in long exposure image 314 in which Charlie is effectively absent).

1. Phase 1: Image Acquisition

A single long exposure can be created from a set of many individual shots that are sharp. As an example, a single long exposure can be created from a sequence of 90 images. The specific number of shots used in forming the long exposure can vary, such as based on the type of scene (e.g., waterfall vs. star trail) and heuristics that impact the risk of shakiness. As examples, if a wider angle (e.g., 35 mm) lens is used, individual $\frac{1}{35}$ exposures may be preferable. If a narrow angle (e.g., 50 mm) lens is used, individual $\frac{1}{50}$ exposures may be preferable. Other heuristics can include motion data from the device accelerometer and performing an assessment of sharpness of previously (recently) taken photos.

One way of acquiring the set of images from which a single long exposure can be created is to make multiple (e.g., 90) "capture" calls on mobile device 200's system photography APIs. On iOS, this is the "AVCapturePhotoOutput" class, and allows for the specification of information image formats, whether to use flash, etc. Such an approach also has drawbacks, namely, it can introduce latency and resource pressure, and trying to perform a sequence of 90 capture calls could cause gaps in the imagery data.

An alternate approach to capturing a set of images from which a single long exposure can be created is to use mobile device 200's system video APIs, treating each video frame as a still photo. On iOS, this is the "AVCaptureVideoDataOuput" class. This API provides a slightly lower quality image and is more limited than the AVCapturePhotoOutput. However, it can reliably deliver a set of 30 frames per second (or more), with some mobile devices capable of capturing video at 60FPS, 120FPS, or faster. In general, using 30 FPS will result in the highest quality long exposure, while other frame rates may sacrifice resolution. A faster frame rate and shorter exposure time can be selected if applicable, such as where a telephoto lens is being used. For example, 60FPS at $\frac{1}{60}$ can be used in conjunction with a long exposure that makes use of the 2× zoom lens of the iPhone X. Related to framerates is exposure time. In various embodiments, a long exposure time is selected to line up with the frame rate to ensure minimal gaps in motion between frames. As an example, at 30 frames per second, an exposure of $\frac{1}{30}$ (per second) can be used. Additional information such as the system recommended exposure can be used when determining a frame rate. Suppose the system recommended exposure is $\frac{1}{120}$ at ISO 400. The shutter speed can be adjusted to match the target frame rate of $\frac{1}{30}$, which is a change of two exposure stops. The ISO can be compensated by moving from ISO 400 to ISO 100. If hardware ISO limitations apply (e.g., mobile device 200 supports a minimum ISO of ISO 200), the shutter speed can be adjusted if needed (e.g., a shutter speed of $\frac{1}{60}$). A higher quality image (e.g., one that contains less noise) can be achieved by creating a long exposure image from multiple frames (each captured at a lower ISO) when compared to a single image captured at a faster exposure with a higher ISO.

2. Phase 2: Alignment

While each of the individual images captured during phase 1 may be sharp, a single long exposure assembled from a set of such images may appear blurry (without additional processing) due to camera movements that occur as images are captured. Over the course of a handheld long exposure, the photographer's arm will very likely have shifted (e.g., as a slow drift in a particular direction as the user's arm gets tired, or as random hand movements due to medical or other factors such as the user being on a boat).

One way such movement during capture can be mitigated is by aligning the images before blending/merging them. As an example, a "target" image from the set can be selected to serve as a reference frame, and all other images can be aligned against the target image to best overlap with it (e.g., by computing an affine transformation matrix for mapping the arriving image to the registration image, applying a plurality of transformation matrixes, etc.). Determining which image should be used as the target image can be performed in a variety of ways. As one example, the first frame that arrives after capture begins can be designated as a default target image, and all other images can be aligned using it. Other selection criteria can also be used, e.g., by allowing the user to select the target image, or by the target image being selected based on the type of scene being captured. As yet another example, the frame most level with the ground (or another applicable reference point) with a portion of frames received after the capture button has been pressed (e.g., most level frame within initial frames) can be selected. As described in more detail below, during optional post-processing, a different target image can also be selected and used retroactively (e.g., to reprocess the result into a new long exposure image).

Some embodiments of mobile device 200 will have more sophisticated hardware that can be leveraged (if available) for performing image alignment in accordance with processing performed during phase two. For example, computer vision APIs can be used to abstract away image registration techniques by determining the broad movement of the image sequence. In iOS, the system's "Vision" framework includes APIs for homographic or translational image registration, the "VNHomographicImageRegistrationRequest" and "VNTranslationalImageRegistrationRequest." Either API can be used in accordance with techniques described herein. In other devices, tools such as the OpenCV open-source framework or other appropriate frameworks can be used.

Image alignment can be a computationally expensive process. While some (e.g., higher-end, more modern) mobile devices might be able to perform alignments on all frames in realtime, some less powerful devices may not be able to keep up. This can lead to a slow experience and if enough frames are backed-up, application 112 may crash or other undesirable behavior may occur as a result. Similarly, if an incoming call is received (even on a high-end mobile device), while a long exposure image is being captured, the operating system of the mobile device may limit available resources to application 112. Operating under such reduced resources (while still capturing the long exposure) can be a more desirable option than forcing the user to re-take the photograph. In various embodiments (e.g., for use with mobile devices that are resource constrained), only some of arriving frames are aligned with the registration image. For example, the device's motion sensors can be used to detect whether significant movement has occurred between frame arrivals, and if significant movement has not occurred, the most recent alignment information can be reused (e.g., as the affine transformation matrix) rather than recomputing a new alignment. Generally, the fewer frames that are skipped during alignment, the better will be the final result. However, on very old devices, a sampling-based approach (e.g., reusing the transformation matrix of previous frame(s)) can nonetheless yield a reasonably sharp image (e.g., even where only one in six frames has a new transformation matrix computed). In some embodiments, if more than a threshold number of frames are skipped or otherwise not processed (e.g., fewer than 85% of the expected frames in a given exposure), additional frames are collected by the camera and processed until the long exposure can be completed. As an example, suppose a user intends to take a five second exposure (and such a captures is underway) but three second into the exposure, the user sneezes, resulting in period where several of the received frames (e.g., between seconds 3 and 4) cannot be successfully aligned with the reference image. If the user is able to recover from the sneeze and subsequently received frames align to the reference image within the tolerance, Application 112 can cause such additional frames to be captured and processed to complete the originally planned sequence.

Another approach to reducing the resource burden of alignment is to shrink the arriving frames to a smaller size before performing alignment. If an image is ¼ the resolution, it will have ¼ of the data to process (and take ¼ of the time). This is another tradeoff, as the alignments themselves may be less accurate. The final image (i.e., used for blending) can make use of the originally captured frames to preserve final image resolution.

3. Phase 3: Merge

In various embodiments, a GPU, which allows for massively parallel operations on pixels, is used to merge aligned images in realtime. For example, a compute shader can be used in conjunction with techniques described herein to blend images together. One potential resource constraint is the memory requirements of working with hundreds of images at once. A twelve megapixel color image requires approximately 50 megabytes of RAM. One hundred of those would be about five gigabytes. A typical commodity mobile device might have fewer than two gigabytes of memory.

One approach to mitigating RAM limitations is to use a single image buffer as a rendering target. As each new video frame in the set is captured and passed into the render pipeline, a fraction of its value is added to the buffer. As an example, if it is known in advance that the long exposure will be made up of 100 individual frames, then an approach for the compute shader is as follows:

T=Pixel in Target Image
C=Pixel in Current Video Frame
For each frame, T=T+(0.01*C)

For maximum precision when working with many floating point values, a 64-bit image can be used. A twelve megapixel image would require approximately 100 mb of memory. With a queue of a few incoming images, the system only has to use a few hundred megabytes of memory. This is much more manageable than the 5 gigabytes of a naive implementation.

Different merging techniques (also referred to herein as "blend modes") can be used for different long exposure effects, and can be based on factors such as available computing resources as applicable. An example merging technique is to create a final image as a mean (or average) of all of the pixels of each of the arriving frames' aligned pixels. Examples of blend modes include a "lighten blend" in which (in a stack of aligned images) those pixels having brighter values are preferentially used in the final image over those pixels having darker values (for a given pixel position within the image). In an alternate approach, the first frame can be used to initially fill the buffer 100%. As additional frames are received, the pixels included in those frames gradually replace the data buffer.

4. Optional Phase 4: Post Processing

One advantage to using various techniques described herein is that because the long exposure image is created on a mobile device in realtime, a realtime preview can be provided as output while frames are captured and blended, allowing the user to see how the process is going, and as applicable, make changes during capture (e.g., holding the mobile device more steady, reframing the subject during capture, etc.).

While post-processing is not necessary to perform long exposure photography using techniques described herein, for certain types of photography, the user may choose to apply additional post processing techniques (e.g., for artistic reasons). As one example, long exposure images captured using techniques described herein may comprise pixels having a more limited dynamic range than would be captured through traditional long exposure techniques. In a traditional long exposure photograph, pixels where bright light was passed through the scene will appear significantly brighter than pixels not subjected to such light. Without performing additional post processing, the brightness values of such pixels using the techniques described herein will be less noticeable (e.g., due to the averaging of clipped highlight values). Two example ways of approximating the phenomenon of traditional long exposure into a realtime digital long exposure are as follows. One solution is to keep a separate frame buffer that keeps track of the brightest pixels over every region of the image, for the duration of the long exposure process. This lighten layer can then be blended in with the long exposure generated during phase 3. This will allow the final long exposure to represent both a blended average of all of the received frames, while also preferentially preserving any particularly bright frames over those average values. Another technique is to boost the brightness of any clipped highlight pixel values obtained during phase 2. For example, if a given pixel has its RGBA values clipped (e.g., at 1.0, 1.0, 1.0), higher pixel values (e.g., at 2.0, 2.0, 2.0) can be used during merge (boosting the brightness values of those particular pixels during blending operations). Additional post-processing can also be performed, such as by applying a Gaussian blur to the long exposure image.

D. Example Process

Figure 4:
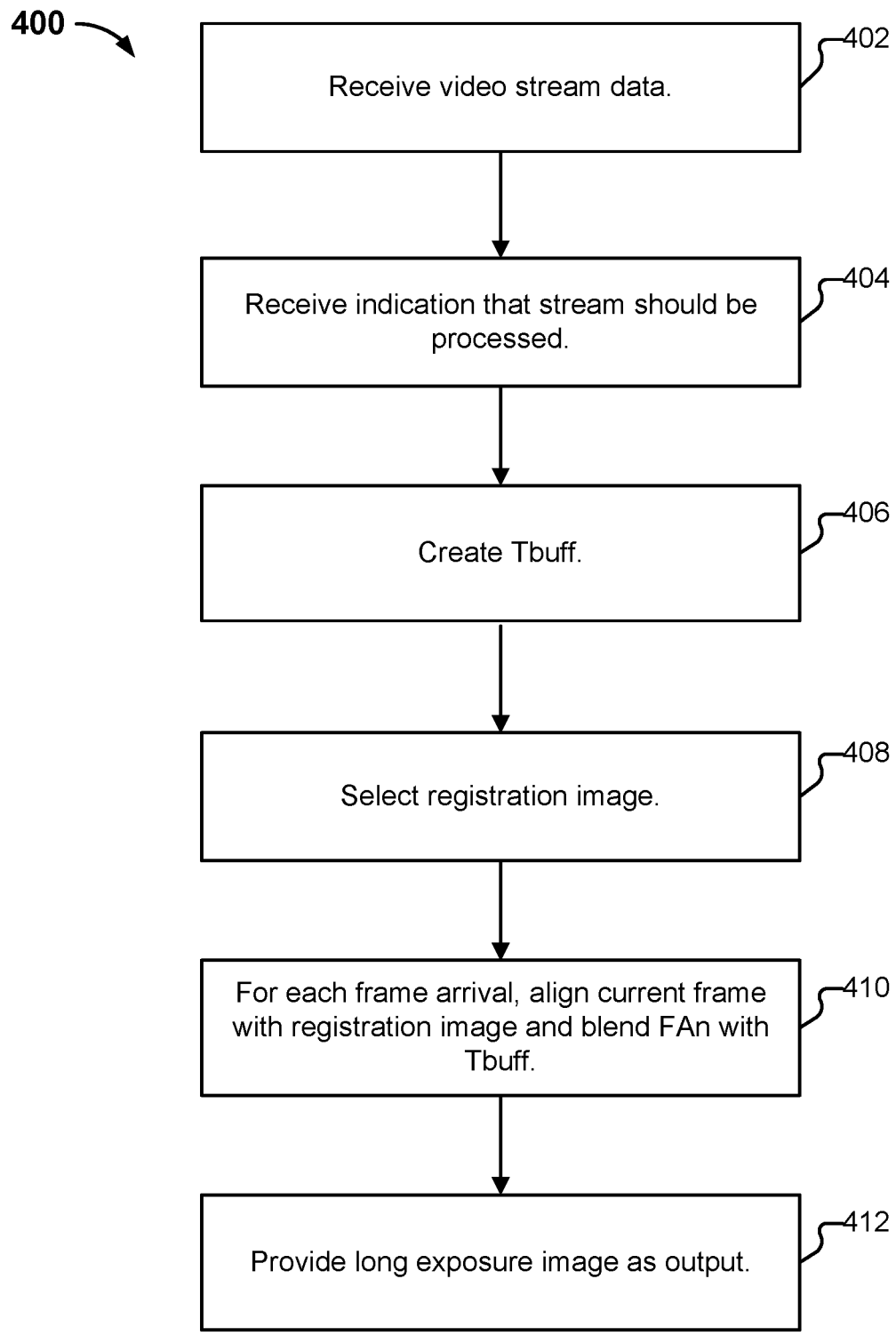
FIG. 4 illustrates an embodiment of a process for generating a long exposure image on a mobile device.

FIG. 4 illustrates an embodiment of a process for generating a long exposure image on a mobile device. In various embodiments, process 400 is performed by mobile device 102. The process begins at 402 when video stream data is received (e.g., as a constant stream of video frames which are translated into image buffers in memory).

As one example of the processing performed at 402, suppose Alice is on a hike and would like to take a long exposure photograph of a water fall in which the flowing water appears smooth. Alice opens a photography application 112 on mobile device 102, which causes camera 202 to begin making available realtime image data to application 112, including as a realtime preview image.

As applicable, an appropriate frame rate and shutter speed are selected, and a number of total frames for processing is selected. This configuration can be performed in a variety of ways. In one example, a default setting (e.g., 30 frames per second, at an exposure of $\frac{1}{30}^{th}$ of a second, for a total of three seconds, resulting in 90 frames) is selected by default for all long exposure images. The user can modify default settings if desired, such as through interacting with controls made available in a user interface. In another example, an appropriate configuration can be selected in response to the user specifying a particular type of scenario. For example, if Alice indicates that she wishes to capture a water feature, appropriate configuration settings can be selected. If Alice instead indicates that she wishes to remove tourists from a photograph of a scenic spot, an exposure of nine seconds can be selected (e.g., capturing 270 frames). If Alice indicates that she would like to capture a night scene and incorporate a light trails effect, a nine second exposure can similarly be selected during configuration and any additional buffers necessary for augmenting the light trails in the final image can be created and configured as well. In various embodiments, an appropriate configuration is automatically selected for the user based on contextual information. For example, at 402 when video stream data is received from camera 202, application 112 can infer a scene type (e.g., water scene, night scene, high contrast scene where highlight clipping compensation should be applied, etc.), such as by using computer vision analysis, and automatically select as an appropriate configuration for the scene.

At 404, an indication that the stream should be processed is received. Such an indication can be received at 404 when Alice selects a "begin capture" or similar button provided by application 112 in an interface (or interacts with mobile device 102 via a voice command). In response to receiving the indication at 404 (or at another appropriate time, such as upon the startup of application 112), mobile device 102 creates (at 406) a set of working buffers including a target video buffer ("TBuff") for the purpose of writing the final image and (e.g., if additional effects have been selected) any additional buffers that will be used in final image creation. As one example, if the user would like to apply a light trail effect, additional information about particularly bright pixels observed in the stream can be maintained in a light trail buffer (and used, e.g., in an additional blend operation with the data stored in TBuff). In this scenario, two versions of the long exposure are created in parallel during processing, a default long exposure (in TBuff) and a light trail buffer which can be blended in a final step. Maintaining multiple buffers also allows the user to see a live preview of effects, and ultimately decide whether or not they should be applied. The buffers will be used to store the first frame of the sequence, the current frame number, the target long exposure image as it is being built, and any other data that could be useful to track during the course of creating the long exposure image. Where the user is taking a selfie, a dedicated buffer can be used to maintain the frame having the sharpest facial image and blending can preferentially incorporate facial pixels (e.g., using computer vision techniques) from that buffer when generating a final long exposure image (e.g., by applying more weight to any such pixels).

At 408, a registration image is selected. As mentioned above, the registration image is used to align each of the frames used in creating the long exposure image. During capture, when a frame arrives from the camera, a check can be performed of the number of frames that have been processed so far in the long exposure. If this is the first frame since the capture started, that frame can be saved to the working buffer for alignment purposes as the registration image.

At 410, arriving frames (e.g., $Fa_1, \ldots Fa_n$) are processed in realtime. For example, at 410, they are aligned with the registration image, and blended (e.g., using GPU shaders) into the buffer.

Finally, at 412 (e.g., once the expected number of arriving frames has been processed), a long exposure image is provided as output. The output can be generated by converting the buffer contents into a JPEG, HEIC, etc., and can be written to the user's photo library using an appropriate system call/framework/etc. As mentioned above, while processing is occurring, the current state of TBuff can be displayed to the user as a preview. Further, in addition to providing a single long exposure image as output at 412, additional (optional) post processing can be performed, e.g., applying light trail or other effects. Further, in various embodiments, in addition to providing a single image as output at 412, the user can be provided with an optional movie file that links each of the frames processed at 410 into a video clip (e.g., showing the evolution of TBuff) as additional frames are captured and blended. In various embodiments, the user is provided with the option to export the individual frames and re-process them. In an example scenario, a user taking a long exposure selfie (e.g., with a waterfall in the background) may, upon review of the finished long exposure, wish to select a different registration frame (e.g., one which includes a more flattering expression). A new long exposure image can be created by repeating applicable portions of process 400.

E. Providing Feedback

The process of capturing and generating a long exposure image using techniques described herein will typically take at least a few seconds. As an example, where Alice chooses to take a long exposure image of a waterfall, capturing and processing enough frames (e.g., 90 frames) may take approximately three seconds after Alice selects a "capture image" button. Alice can be provided with a variety of feedback (e.g., via app 112) while capturing/processing is underway.

One piece of feedback that can be provided is the estimated time remaining on the creation of the long exposure. The information can be provided as a percentage (e.g., 85% complete) and can also be provided as a number of remaining frames (e.g., "completed 34 frames of 90") or in another appropriate manner.

Another piece of feedback that can be provided is a realtime preview. As more arriving frames are blended into the exposure, the current state of the long exposure can be shown (as if the long exposure had ended in that moment). This lets the user know information such as whether the image has become too blurry, or if there has been a miscalculation in the long exposure, ruining the image, during capture (e.g., allowing the user to abort the process instead of wasting additional seconds on a problematic capture). Similarly, if the user is happy with the image-in-progress, the user can elect to end processing early (e.g., ending a 9 second exposure at 4 seconds) and save the result (without bothering to capture/process the additional five seconds worth of frames).

Another type of feedback that can be provided to the user is an indication of how "shaky" the camera is. If the user's arm is moving too much (and the arriving frames are outside a threshold ability to be aligned with the registration image), then the camera will capture blurry frames which cannot be stabilized (e.g., despite use of techniques described herein). In various embodiments, application 112 provides a shakiness indicator, and encourages users by showing "STABLE" when the device is adequately stable (e.g., a threshold number of frames of the long exposure sequence are within a sufficient tolerance of the registration image). Additional information can also be provided to the user, such as suggesting the user retake the picture while attempting to be 20% more steady (e.g., by bracing the user's arm).

F. Synthesizing Intermediary Frames

Figure 5A:
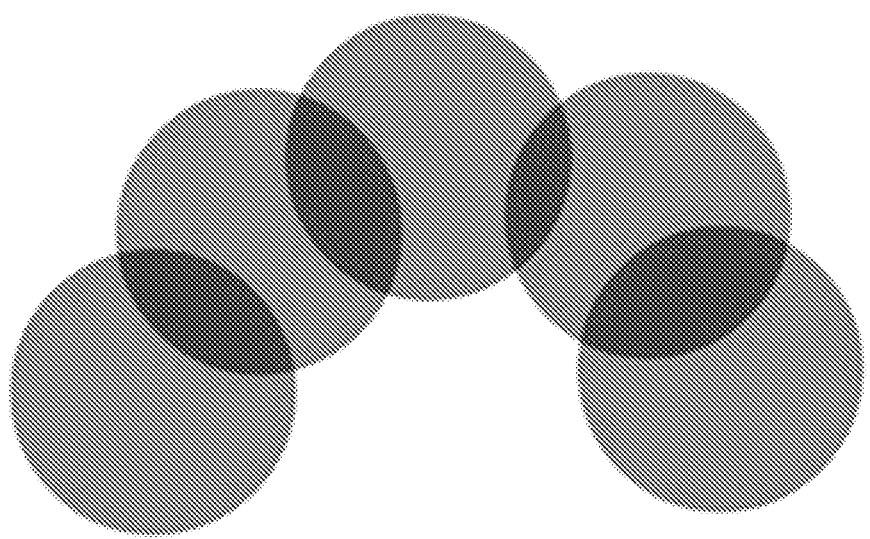
FIG. 5A illustrates an example of a long exposure image created without the use of synthetic frames.

In some scenarios (e.g., scenes with fast motion), using various of the techniques described above may result in a final long exposure image that includes unwanted (e.g., by the user) gaps. An example of this is illustrated in FIG. 5A, where a long exposure was created of a bouncing ball using techniques described above. These gaps can occur due to the capturing sensor's rolling shutter. Between each of the five frames that were used to create the long exposure, the ball moved sufficiently quickly that there was little overlap in its position between frames. An alternate reason these gaps can occur (or that worsens existing gaps) is where hardware-based HDR is used by the device. Using native iOS HDR functionality as an example, to achieve HDR, the device merges two frames for each HDR image, effectively halving the frame rate (and doubling any gaps as compared to when HDR is not used).

Figure 5B:
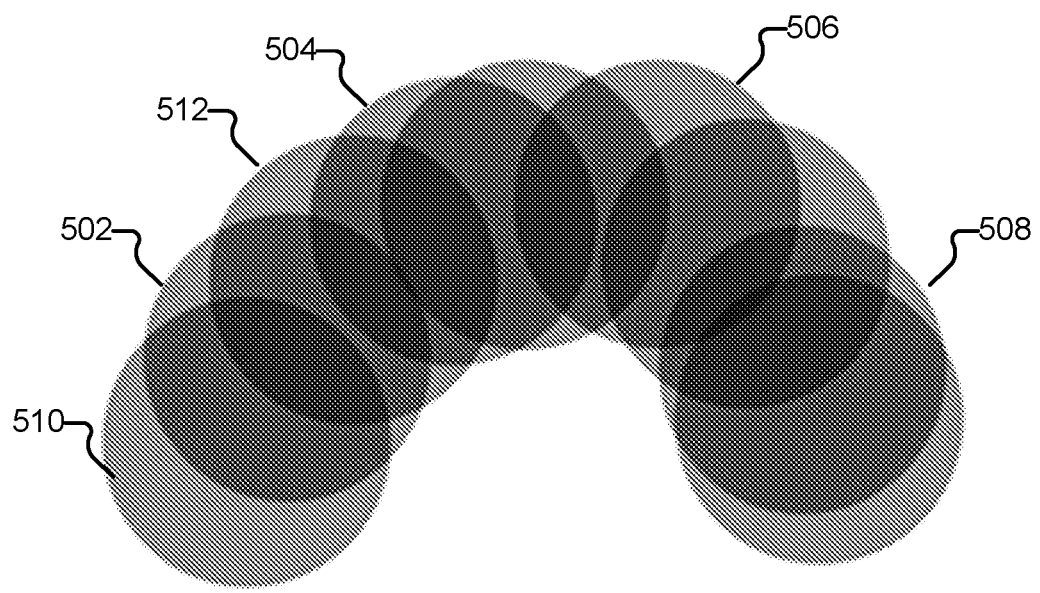
FIG. 5B illustrates an example of a long exposure image created with the use of synthetic frames.

If desired by the user, a more attractive image (e.g., one with reduced gaps) can be generated by having application 112 synthesize intermediary frames (also referred to herein interchangeably as motion interpolation). By introducing synthesized frames (e.g., into the buffer) and processing them along with the other (non-synthesized) frames, the resulting long exposure image will appear more natural/smooth. An example of a long exposure image making use of synthesized intermediary frames is illustrated in FIG. 5B. In FIG. 5B, four synthetic frames have been interposed between the five non-synthetic frames that were used to create FIG. 5A. As a result, the resulting image shown in FIG. 5B more smoothly conveys the motion of the ball (i.e., by incorporating four additional images of the ball in regions 502-508).

A variety of techniques can be used to incorporate synthetic frames into the processing of a long exposure image, which will now be described.

1. Determining Whether to Incorporate Synthesized Frames into a Particular Long Exposure As a first consideration, in various embodiments, application 112 is configured to selectively determine whether synthesized frames should be incorporated into a particular long exposure image or not. While it is possible to use the frame synthesizing techniques described herein for every long exposure image generated by application 112, it may not be desirable. Some scenes (e.g., where the user wishes to incorporate one or more prominent fast motion elements such as a moving vehicle or object) will benefit more from the inclusion of synthesized frames during processing than others (e.g., a lower motion scene such as a waterfall scene). Further, while techniques described herein are efficient and can be effectively run on a consumer-grade cellular or other device, if incorporating such frames will not represent an improvement over a long exposure that does not incorporate such frames, it could be advantageous to save processing resources (and not make use of synthetic frames).

A variety of techniques can be used in making the determination of whether or not to incorporate synthesized frames into a particular long exposure. A first approach is for application 112 to rely on a user to indicate a preference (e.g., by enabling or disabling the feature in an interface made available by application 112 where other settings are configured, such as long exposure duration). A second approach is for application 112 to make the determination, and either recommend to the user that the frame synthesis feature be turned on (or off), or automatically incorporate synthesized frames (or not). A variety of approaches can be used by application 112 to determine (without a user explicitly enabling or disabling the feature) whether to incorporate synthesized frames into a particular long exposure. Examples are as follows:

a. Heuristics

Heuristics can be used in determining that synthesized frames should be used in generating a particular long exposure image. As one example, when the user starts application 112 (or at another appropriate time, such as when the user indicates a capture should be commenced), application 112 can gather information about the scene to be captured and environmental information (e.g., lighting level, whether the device is mounted on a tripod or not, whether the accelerometer or other sensor on the device indicates the device is pointed at the sky, whether hardware HDR is turned on or not, the shutter speed, whether the exposure is set to 30 seconds or 5 seconds, etc.). The collected information can be used to prompt the user with a recommendation that the feature be turned on, or the feature can be turned on without prompting the user. In a first scenario, heuristics can be used by application 112 to determine that a user is photographing cars on a bridge landmark (e.g., using GPS information and accelerometer/compass information to determine that the user is photographing the Golden Gate Bridge) and turn on intermediary frame synthesis. In a second scenario, heuristics can be used by application 112 to determine that the user is photographing a waterfall during the daytime (e.g., using GPS information and light levels) and not turn on intermediary frame synthesis.

b. Deep Learning

Deep learning is an alternate approach that can be used by application 112 in determining whether or not to turn on the intermediary frame synthesis feature, instead of, or in conjunction with, a heuristics approach. As with the heuristics approach above, deep learning can be used to perform scenario detection. Generally, more robust scene detection can be performed using deep learning (e.g., identifying the scene as involving "cars on a bridge" or "fireworks" or a "waterfall") using computer vision techniques (e.g., provided by a framework such as the Vision framework for iOS). In some embodiments, application 112 makes use of a list of predetermined scenes for which intermediary frame synthesis would be useful. If the scene detected at startup (or capture initiation, etc.) matches one of those types of scenes (or a threshold combination of various factors observed using computer vision techniques), the feature can be turned on (or a recommendation can be made to the user that the feature be turned on). As used herein, a "set of image capture environment information" refers collectively to device-related information (e.g., GPS data, accelerometer information), as well as scene-related information that can be used in determining whether to incorporate one or more synthesized frames into a long exposure image, whether selected by a user (e.g., "I would like to photograph a waterfall"), through the use of computer vision or other frameworks (e.g., the scene is a 95% match with "fast moving car"), etc.

The list of which scenes (e.g., cars on a bridge at night) or scene components/optional heuristics (e.g., ball+outdoors or night+pointed at sky) will benefit from synthesized intermediary frames during long exposure image creation can be determined in a variety of ways as well. As one example, photography experts can curate such a list of categories. As another example, a neural network approach (or other machine learning approach) can be used to train a model using a set of example initial images (i.e., the first frame in a long exposure) labeled as benefitting from synthetic intermediary frames when processed and another example set of initial images labeled as not benefiting. The model can then be used by application 112 (e.g., in conjunction with a framework such as OpenCL for iOS) to detect (e.g., on startup or capture initiation, etc.) whether intermediary frame synthesis should be used for a particular long exposure generation. One example way of obtaining such training sets is to ask a group of users to take various long exposure images of various scenes both with and without the synthetic frame feature turned on, and ask them to indicate their preferences for or against use of the feature. The results can be pooled (and/or voting on particular images can be crowd sourced) and used as training data for the neural network.

c. Optical Flow

Figure 6A:
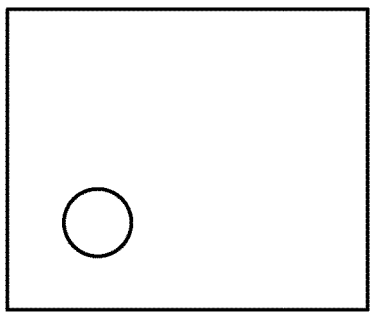
FIGS. 6A and 6B illustrate frames representing the movement of a ball.
Figure 6B:
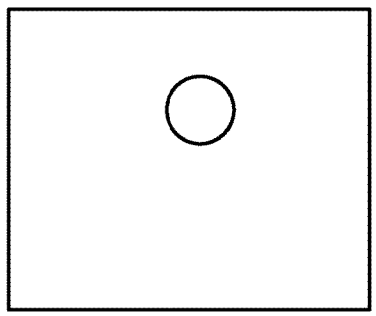
Figure 6C:
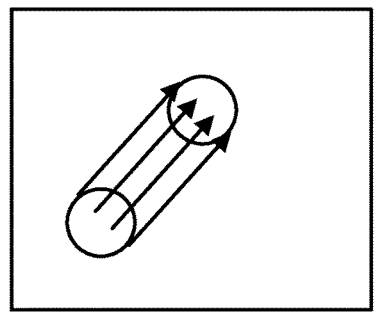
FIG. 6C illustrates an example of an optical flow field.

A third way of determining whether motion interpolation should be used when generating a long exposure image is for application 112 to make use of an optical flow field. FIGS. 6A and 6B represent two frames of a ball moving over time. Motion can be determined by examining sets of images (such as FIGS. 6A and 6B) for the movement of various feature points. The velocity of the movement, and the direction of the movement, can be represented using an optical flow field. A simple example of an optical flow field is illustrated in FIG. 6C, describing the motion of feature points between FIGS. 6A and 6B.

In various embodiments, application 112 is configured to generate an optical flow field. As one example, prior to capturing a given long exposure image, application 112 can ask the user to make a test image, where application 112 captures an initial set of frames using the video API. Application 112 can use the initial images to generate a flow (e.g., using a framework such as OpenCV) and analyze the flow to determine whether or not the scene would benefit from the use of motion interpolation.

Figure 6D:
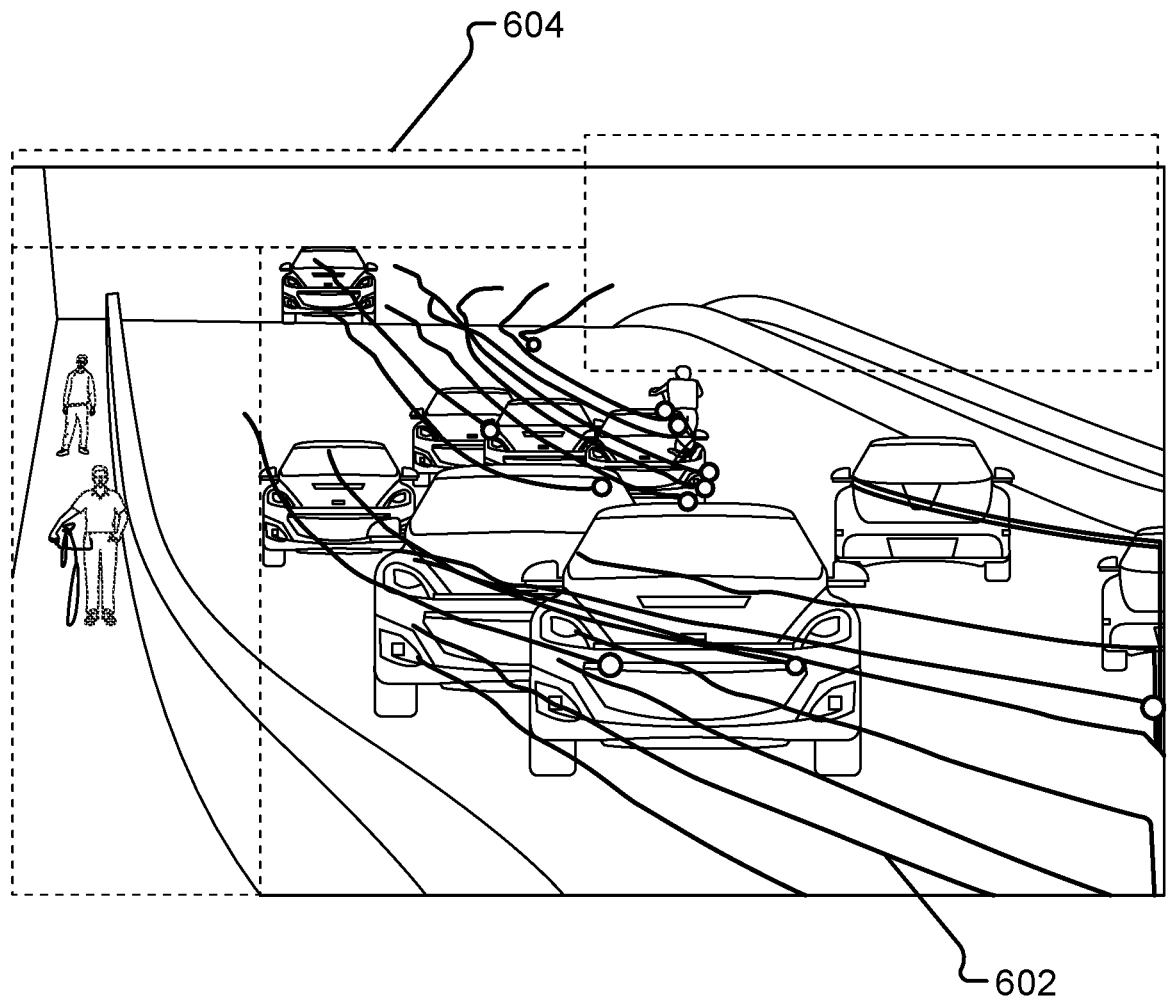
FIG. 6D illustrates an example of an optical flow.

FIG. 6D illustrates an example of an optical flow, produced by OpenCV using the Lucas-Kanade method for a sparse feature set (i.e., corners-only, using the Shi-Tomasi technique), for a scene of cars moving on a bridge. The lines (e.g., line 602) track the flow of the cars and appear, consistently, in a portion of the image. Other portions of the image are static (e.g., dotted region 604).

Figure 7A:
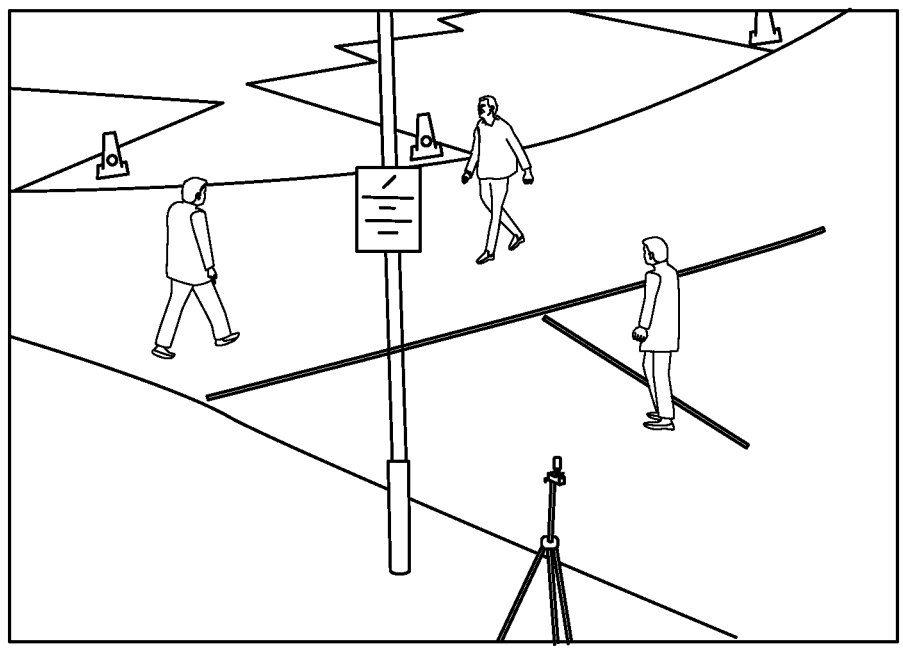
FIG. 7A illustrates an example of a scenario where individuals are walking in different directions.
Figure 7B:
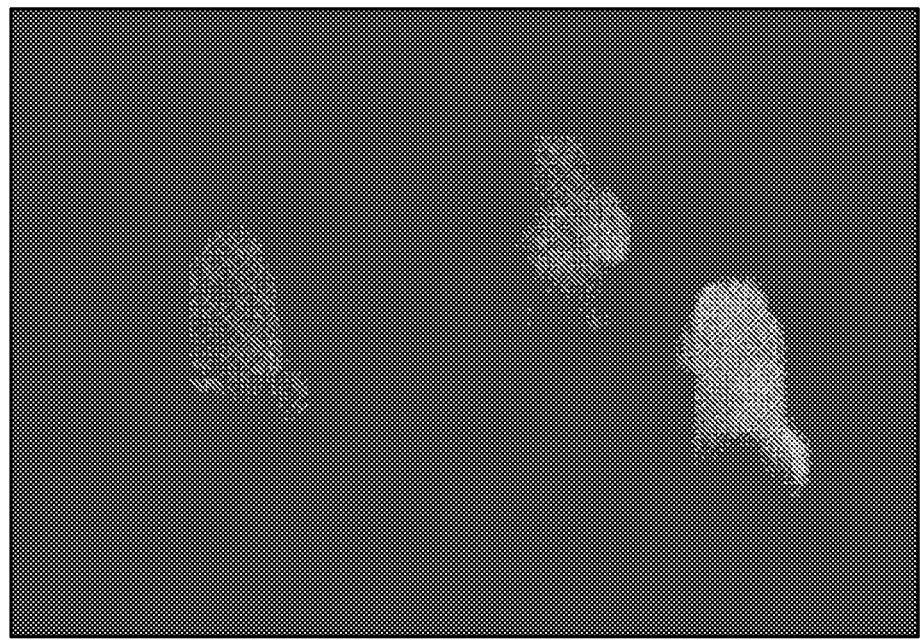
FIG. 7B illustrates an example of an optical flow field.

An alternate approach (for finding denser optical flow) is to use Gunnar Farneback's technique (also producible using OpenCV). FIG. 7A represents a scenario where three individuals are walking in different directions. Using this technique, the optical flow for every point in the frame is determined. The result (7B) is a two channel array with optical flow vectors with magnitude and direction, and can be color coded for better visualization (where direction corresponds to hue and magnitude corresponds to value). In this example, red objects (the person on the left) are heading to the upper right, green objects are moving to the lower left (the person in the middle), and blue objects (the person on the right) are heading to the upper left. Additional examples of optical flow approaches that can be used include the Horn-Schunck method, and the TV-L1 method (which lends itself well to GPUs).

If a strong optical flow is observed in specific areas of a scene over a period of time and not others (e.g., the lines depicted in FIG. 6D), application 112 can recommend that motion interpolation be used. If a weak optical flow is observed, or if optical flow is observed throughout the image, application 112 can refrain from recommending use of motion interpolation in making a long exposure image. Further, if optical flow is observed throughout the image, this can be an indication that the device is moving (e.g., the user has shaky hands or it is very windy) and an appropriate recommendation can be made (e.g., that the user brace the device).

2. Incorporating Synthetic Frames into a Long Exposure Image

Having determined that synthetic frames should be used when generating a long exposure image, a variety of ways of generating those frames can be used by application 112. A first approach is to use an optical smoothing (also referred to as motion smoothing) technique. Such techniques can readily be used, in realtime, on consumer devices (as evidenced, for example, by the inclusion of optional motion smoothing as a feature on consumer televisions). Motion smoothing techniques often rely on optical flows to interpolate frames. As one example, motion smoothing (i.e., generation of a synthetic frame) can be performed by using the optical flow shown in FIG. 6C to warp the images shown in FIGS. 6A and 6B, respectively (i.e., partially interpolate the two images using the vector fields of FIG. 6C). The result of the warping operation (an image depicting a ball in a position halfway between where it is seen in FIG. 6A and where it is seen in FIG. 6B) can be used as an intermediary frame when creating a long exposure. Returning to the example shown in FIG. 5B, an image of the ball at position 502 could be synthesized from an optical flow generated from frames that capture the ball at positions 510 and 512.

In a related approach, instead of generating an optical flow using the native resolution of the arriving frames, optical flow can be computed by analyzing a thumbnail or other reduced resolution of the received video frames. This approach can save computational resources.

Yet another approach for generating synthetic frames is to use a deep learning approach. In an example, a neural network can be trained (e.g., by a third party) using sequences of images (e.g., captured as various scenes in real life using a high frame rate camera to generate 120 frames and drop half), or automatically generated using 3D modeling software, where the neural network can learn to "guess" what an intermediary frame should look like (e.g., using the dropped frames to guide the training). The trained model can then be provided to application 112 for use in generating intermediary frames for images received in realtime from the video framework. Example ways of using deep learning techniques of optical flow (which can in turn be used to generate intermediate frames) include using the FlowNet and the RAFT architectures.

Figure 8:
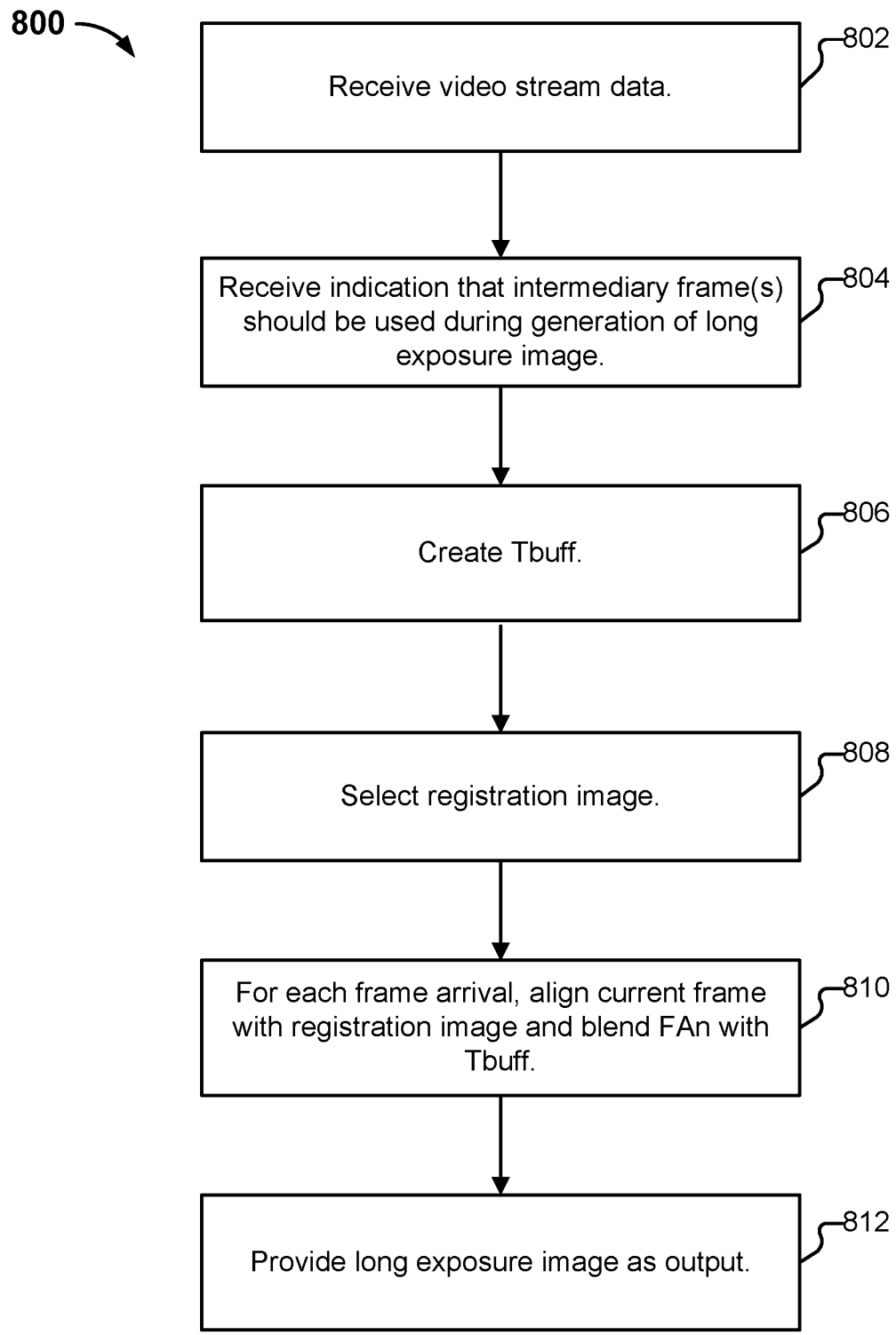
FIG. 8 illustrates an embodiment of a process for generating a long exposure image that incorporates at least one synthetic frame.

FIG. 8 illustrates an example of a process for generating a long exposure image using one or more synthesized intermediary frames (e.g., on a mobile device or other consumer device). In various embodiments, process 800 is performed by mobile device 102. Process 800 can also be performed on other devices, such as digital cameras (e.g., to prevent sensor-overheat during a very long exposure), quadcopters/drones, observational systems, etc. Further, while described in the context of a realtime video capture, in various embodiments, process 800 is performed (e.g., by application 112) on a previously captured video (e.g., as selected by a user from the user's camera roll for conversion into a long exposure).

The process begins at 802, when video stream data is received (e.g., as a constant stream of video frames which are translated into image buffers in memory). At 804, an indication that synthetic frames should be used in the processing of a long exposure image is received. As explained above, the indication can be received in a variety of ways, such as by the explicit direction of a user (e.g., selecting a button), and in response to application 112 determining that motion interpolation should be used in the creation of the current long exposure image. In various embodiments, the indication received at 804 is received prior to receipt of video stream data (i.e., steps 804 and 802, as with other steps in processes described herein, can be performed in different sequences, as applicable). As applicable, the parameters for performing the long exposure capture (e.g., number of frames to be captured and blended) can be adjusted based on the indication (e.g., increasing or decreasing the suggested number of frames to be captured or duration of the image based on whether or not the motion interpolation feature is used).

Figure 9A:
FIG. 9A illustrates an example of a long exposure image created without the use of synthetic frames.
Figure 9B:
FIG. 9B illustrates an example of a long exposure image created with the use of synthetic frames.

As with portion 406 of process 400, at 806, a set of working buffers is created. In an example implementation (and similar to the light trail example provided above), two versions of the long exposure can be created in parallel during processing: a default long exposure (in TBuff) and a synthetic frame long exposure (stored in a synthetic frame buffer that holds any generated intermediary frames during processing). The two buffers can be blended in a final step (812). Further, in this example implementation, as applicable, a user can be presented with two final images and asked to select a preferred one (whether for training purposes as described above, or otherwise): the first final long exposure image comprises only non-synthetic images (e.g., FIG. 9A where the car streaks include bumps), while the second final long exposure image blends the results of both the TBuff and synthetic frame buffer (e.g., FIG. 9B where the car streaks are smoother).

Portion 808 of process 800 corresponds to portion 408 of process 400. Portion 810 of process 800 corresponds to portion 410 of process 400, however, additional processing is performed— namely, generation of synthetic frames (e.g., using the most recently arrived video frame and its predecessor video frame) in accordance with a technique such as is described above, and insertion of the synthetic frames into the synthetic frame buffer.

II. Realtime Image Analysis and Feedback

The environment described above and/or various embodiments thereof can also provide other improvements to the capture of content in addition to/instead of long exposures.

A. Introduction

Photographers/videographers often rely on analysis tools built into their camera equipment to make realtime decisions, such as an appropriate shutter duration for a desired exposure (e.g., based on quantitative data). Professional photographers typically capture their images in a "RAW" state (commonly packaged in a Digital Negative (.DNG) file), which allows greater flexibility when editing compared with other formats. Photographers then generally share their images to the world in a "processed" state (typically contained in file formats such as Joint Photographic Experts Group (JPEG)), which is more efficient for both transportation and rendering (and makes use of display-referred values instead of scene-referred values).

Due to factors such as the unwieldy nature of RAW data, existing realtime exposure and other tools do not take into consideration the 14-bit RAW data that is captured by an example sensor. Instead, they analyze 8-bit, processed data (automatically processed by the device) that is also used to display the image in the viewfinder. This data is usually generated with an Image Processing Unit prior to display on screen.

Figure 10:
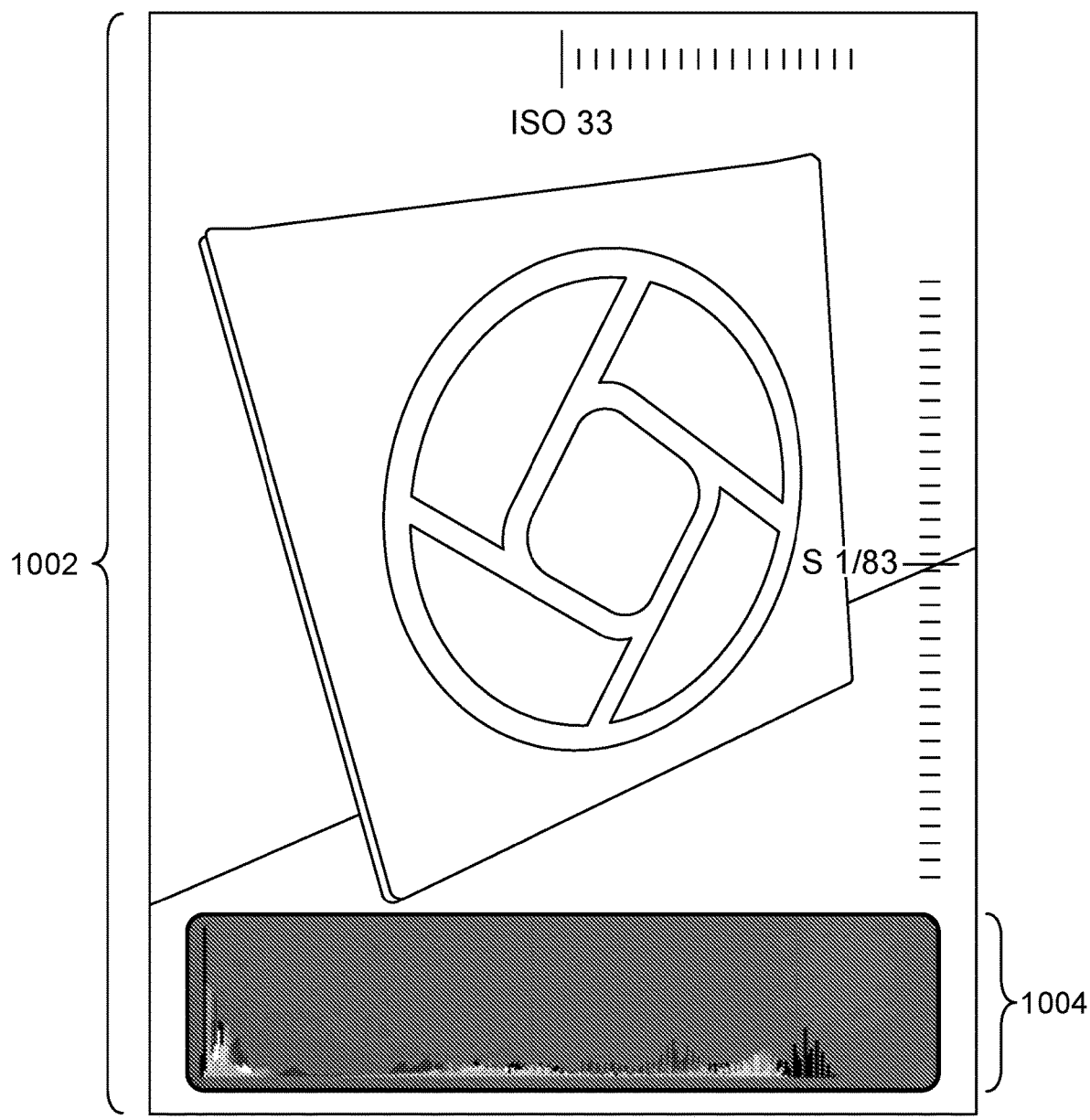
FIG. 10 shows an example of a viewfinder display that includes an image to be captured and a histogram.

FIG. 10 shows an example of a viewfinder display that includes an image to be captured (1002) with a histogram overlayed at the bottom (1004). The bars in the histogram quickly inform the photographer how much of the image will be under and/or over exposed, and where most values generally lie. The histogram is updated in realtime, inside the viewfinder as the photographer composes a photograph. Unfortunately, these realtime tools have historically had accuracy issues because they make use of post-processed data which have had a number of lossy mechanics applied.

Figure 11:
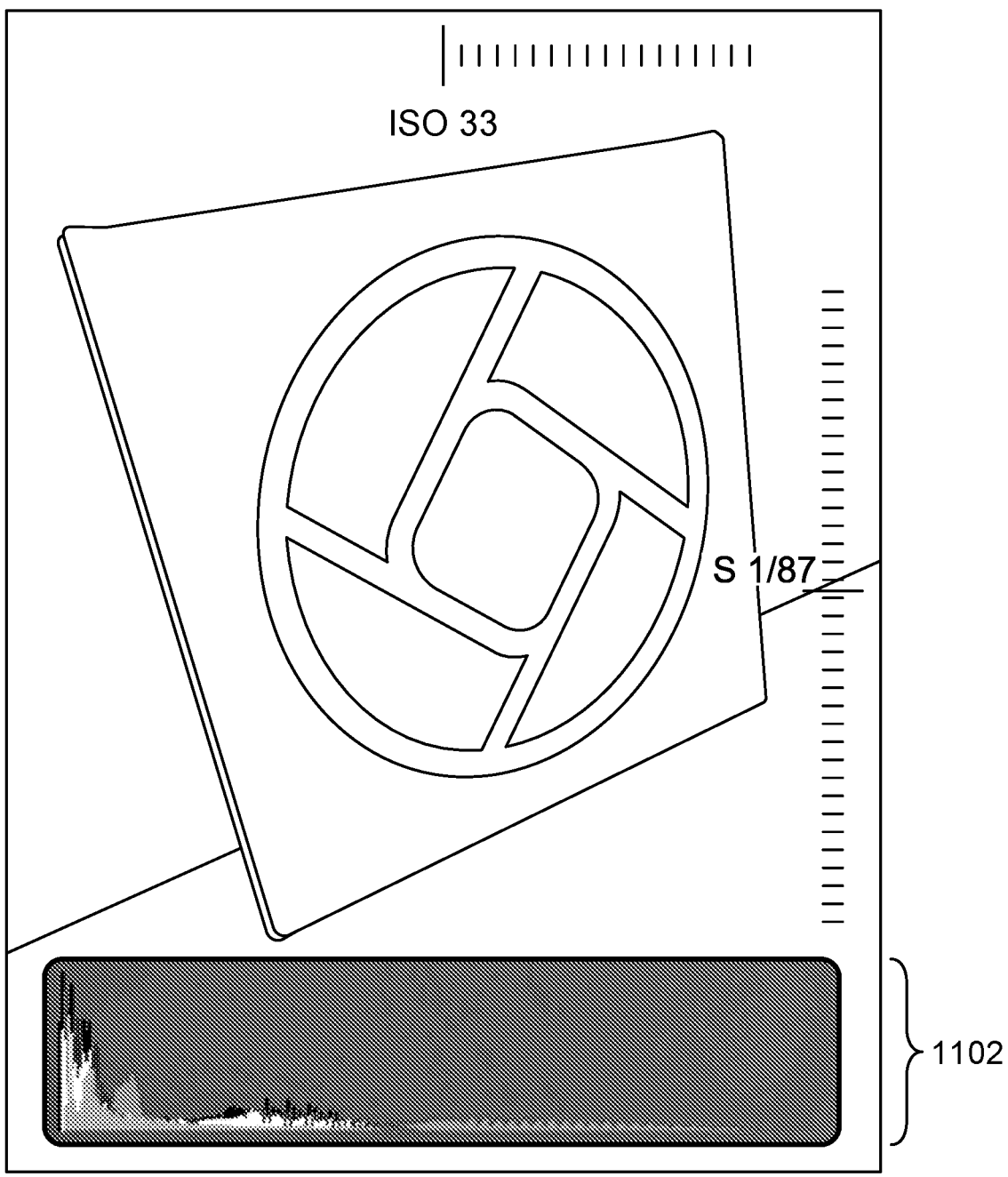
FIG. 11 shows an example of a viewfinder display that includes an image to be captured and a histogram.

Described herein are various novel techniques that, instead of operating on/using processed data (e.g., 8-bit data) analyze RAW data (or similar types of data such as linear RAW/ProRaw data). The results of the RAW analysis are presented in realtime, so that the photographer has a better understanding of what will actually be captured in their RAW file. The histogram depicted in FIG. 10 makes use of pre-processed data, whereas histogram 1102 depicted in FIG. 11 (of the same scene) makes use of RAW data, in accordance with techniques described herein.

B. RAW vs. Processed Images

In order to capture an image digitally, light readings go through several stages before arriving in a structure that can be displayed on a screen. First, the light strikes an image sensor which contains an array of "photo sites," which translate light into voltage measurements (measuring the intensity of the light). These measurements (also referred to as scene-referenced values) are converted into numerical values which can be processed by a computer.

Figure 12A:
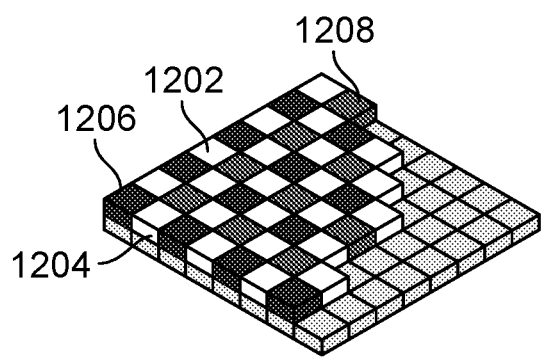
FIG. 12A illustrates an example of a Bayer filter.

Photo sites are effectively color blind— they see photons, not specific colors (wavelengths of the light). A color filter array can be placed over the sensor (e.g., a pattern alternating red, green, and blue microfilters) allowing the wavelength (color) to be measured as well. One example of a color filter array is a "Bayer filter" (also depicted in FIG. 12A), which uses a mosaic pattern of two parts green (1202, 1204), one part blue (1206), and one part red (1208) to mimic the human retina's increased sensitivity to green light. The "Bayer filter" is the predominate method of capturing color photos on digital cameras. Other filters also exist, and techniques described herein can be adapted to RAW files corresponding to them as applicable (e.g., Foveon).

The values recorded by the sensor at this stage cannot be displayed on screen but rather need to undergo additional processing.

1. Problem 1: Processing is Expensive

A first problem is that the collected data for the image represents discrete red, green, and blue values. Directly displaying a representation of those values on screen would look like a checkerboard. Instead, the values need to be combined into a single color pixel value in step known as "debayering" (in the context of a Bayer filter color filter arrangement) or "demosaicing" (more generally, and used hereinafter interchangeably with "debayering").

Figure 12B:
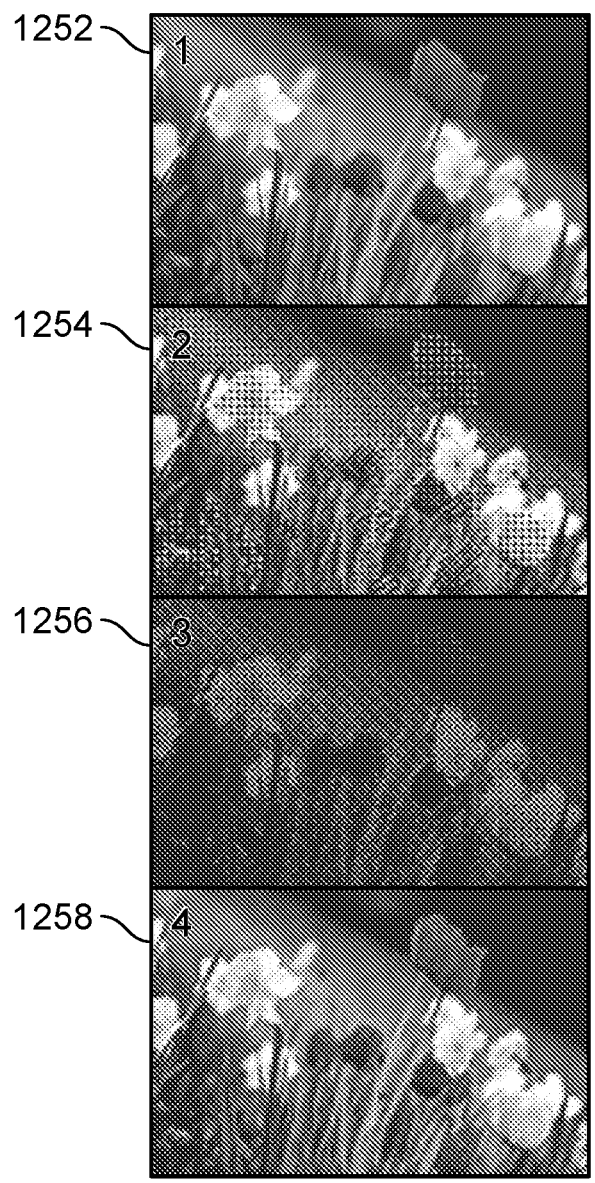
FIG. 12B is a sequence of images illustrating a demosaicing process.

An example of a demosaicing process is illustrated in the sequence of images of FIG. 12B. The first image (1252) represents the original scene (e.g., as viewed by a human eye). The second image (1254) represents a 120×80 pixel sensor reading (of the light intensity). The third image (1256) represents the output of a Bayer filtered image sensor, in which each pixel has only one of a red, green, or blue component. The fourth image (1258) is the reconstructed image— created by interpolating the missing color information. Demosaicing is a non-trivial process, as sometimes red/green/blue (RGB) neighbors fall on the edge of a subject. Naïvely combining RGB values can lead to visual artifacts such as "false color" or "zippering."

After demosaicing, additional steps must be taken to clean up a RAW image. Even in ideal conditions, every digital sensor will exhibit noise, and it is extremely common for sensors to have "dead pixels." This is all to say, the processing of a RAW is computationally expensive, and processing a 4K RAW image can take several seconds on current mobile phones.

Processing limitations are one reason that photographers publicly share their photos in a preprocessed image format such as JPEG. It is less expensive to decode these file formats, and they require much less data, as discussed in the next section.

2. Problem 2: RAWs are Large

Modern image sensors capture more dynamic range than is visible by modern displays. While a modern display only needs 8 or 10 bits per color channel, example camera sensors record 12 to 16 bits of information per photo site.

Higher bit depth has important implications beyond computer storage. Computers operate efficiently when working in 32-bit chunks. A single pixel has three color channels, and an image with 8-bit color depth works out to 24-bits per pixels (8-bits per color, multiplied by three channels). It is acceptable (but not ideal) to arrive at a value less than 32-bits, as the remaining eight bits can either be padded with zeros or used as an alpha channel.

Recent image formats have moved from using 8-bits to using 10-bits per channel, to facilitate high dynamic range images. These three channels only take up 30-bits, which is still within the 32-bit boundary.

A 12-bit image would require 36-bits to represent an RGB triplet. That leaves 28 wasted bits. That may be acceptable for a professional photographer during editing, but it would be an incredibly wasteful bit depth for, e.g., sharing photos on a website or social media application.

Figure 13:
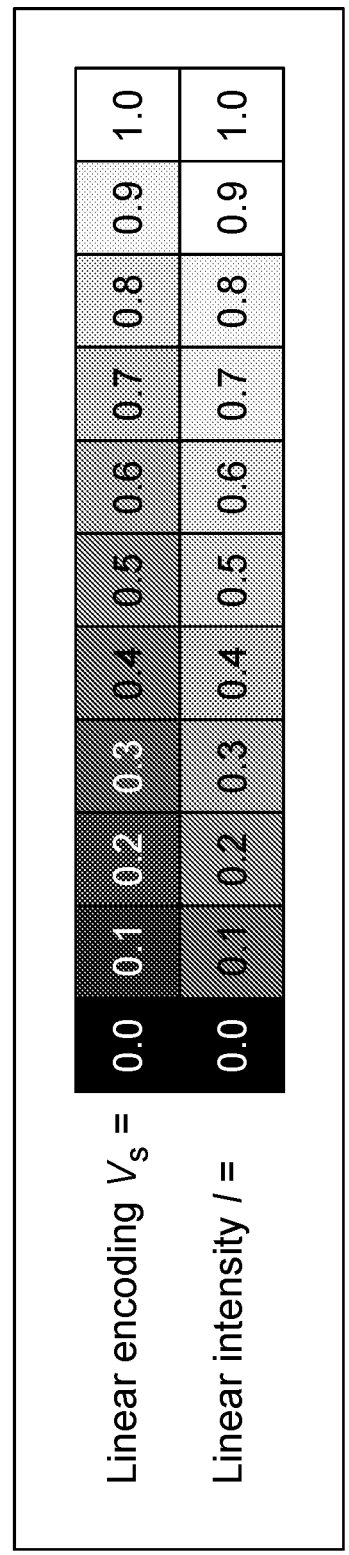
FIG. 13 depicts the difference between linear gamma-compressed luma input and linear luminance output.

One option is to take a 12-bit image and convert it to an 8-bit image through simple quantization. This is problematic because the 12-bit image records linear light. Each value represents the photons that were captured at the photo site. Storing linear data in an 8-bit format leads to visual artifacts. This is because the human visual system is more sensitive to values in the shadows. An example of this is illustrated in FIG. 13, which depicts the difference between linear gamma-compressed luma input (a scale with linearly-increasing encoded luminance signal) and linear luminance output (a scale with linearly-increasing intensity scale). The top encoding shows what human eyes perceive to be a linear gradient. The bottom shows true linear values. While 8-bits can record 256 values, the vast majority of those values are wasted. In practice, this would cause "banding" or "posterization" in shadow areas of an image.

Figure 14:
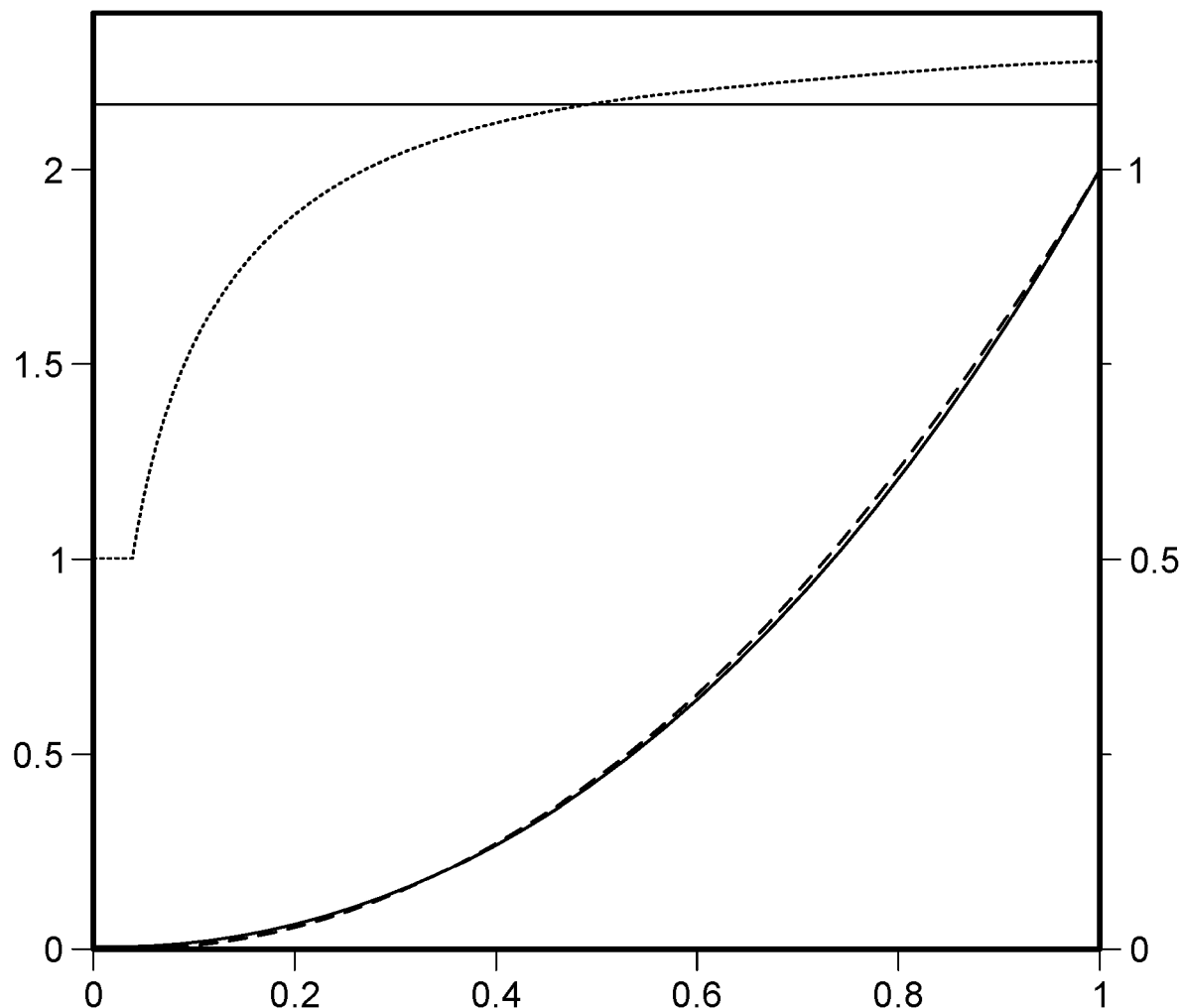
FIG. 14 illustrates a standard gamma-expansion nonlinearity and its local gamma value.

One solution is to take the linear data and apply a transfer function before storing it in 8-bits. Effectively, it allows more bits to be spent on the shadows than highlights. Then, at the time the image is displayed on a screen, the inverse of the function could be applied, returning it to linear values. An example of such a transfer function is known as a gamma curve, and plays a significant role in image processing. In FIG. 14, the top curve represents the encoding function. The bottom curve represents the decoding function, used at display time.

C. The Role of Image Signal Processors

Even before a photo is shared (e.g., via the Internet), bandwidth and computational complexity play an important role at the time of capture. Very often the performance bottleneck in a computer is the amount of data sent through its bus. For example, on many systems it would be infeasible to transport and decode a full RAW image at 60 frames per second.

Modern devices contain an Image Signal Processor (ISP), also known as an "Image Processing Engine," or "Image Processing Unit." This is a dedicated chip that can process RAW data after it leaves the sensor, handling tasks such as demosaicing and image cleanup, so it can pass on less data. An ISP allows a digital camera to display live video in the viewfinder in an efficient manner. Unfortunately, such processed data is inaccurate, as confirmable by a comparison of results provided by a realtime tool such as a realtime exposure tool (e.g., a histogram) and an "offline" tool such as a photo editor.

A first issue is that while the RAW format can store data with greater dynamic range than what is displayed, the primary purpose of the ISP is to produce a lower-dynamic-range image that can be displayed on a device. In order to produce such a lower-dynamic-range image, it is necessary that data be discarded, such as the highlights and shadows. This could lead to a photographer not understanding the amount of "headroom" available in a bright environment, and cause them to under-expose an image when it is not necessary.

A second issue is that the data in the ISP is already gamma compressed. In the context of a histogram, the result is graphs that have an inaccurate skew to the right.

D. Extended Dynamic Range Analysis and Feedback in Realtime

The accuracy of realtime image analysis and feedback can be improved by simplifying the RAW development process. In practice, the tradeoffs required to hit realtime deadlines are acceptable for the purpose of feedback prior to image capture. The approach and various embodiments thereof are also referred to herein as "Extended Dynamic Range" (XDR) Analysis, referring to the goal of operating on the greater dynamic range provided in a RAW file, as opposed to the limited dynamic range data typically provided to/in a viewfinder. An example environment for performing XDR Analysis is described above. The following is an example process for performing XDR Analysis.

1. RAW Acquisition

A first task is to obtain RAW images in realtime, in a process also referred to herein as "RAW Streaming." In particular, the system (e.g., mobile device 200) is asked to return RAW data as quickly as it can sustain. If the system is capable of providing a native API to accomplish this, it can be used to stream RAW buffers coming off of the sensor at the sustainable frame rate. If the system does not provide such an API, an alternate approach is to use a "timer," which is a piece of code that is run at a consistent time interval. In particular, the timer can be used to request RAW captures as quickly as is sustainable (e.g., using a photo capture API and specifying that RAW data should be delivered). For example, by setting up a timer to execute once every 1/20th of a second, 20 RAW frames per second can be sustained. In an example implementation on iOS, such a timer could be implemented with the "NSTimer" API and can be used. In an example implementation on Android, such a timer could be implemented using the "Handler" API.

Unfortunately, while it might be desired that RAW images be provided at the rate of 20 per second, the system may not be able to deliver images at that rate. This is problematic. Suppose the system takes ½ a second to deliver each image; after one second, only two images would be delivered while 18 remain in a buffer. After two seconds, the buffer may fill up with 36 photos. As the unprocessed photos begin to pile up, at the very least the system will begin to "drop" frames. At worst, it could consume so much memory that the application (e.g., application 112) could crash. The severity of the situation can vary based on the particular device (e.g., iOS may have better control over memory management, due to its reference counting approach, while Android's non-deterministic "garbage collector" approach is especially problematic). To avoid such problems, it is important that RAW files are delivered and processed at the same rate they are requested.

Devices that capture RAW images typically offer (often by default) to provide as output both the RAW file and an image processed by the ISP (e.g., a .jpeg or a bitmap ready to be bit blit to a display). One technique for speeding up delivery of RAW files on a mobile device is to only request the RAW image, and not the pair of RAW and processed images. By opting-out of the processed image, this frees up valuable bandwidth and processing power that deliver the RAW faster.

Another obstacle in high speed image delivery is automatic exposure and automatic focus adjustments. For example, on iOS, when a photo capture is requested, the system may try to perform one last focus operation before actually capturing the photograph. This focus can take several seconds, which is an unacceptable length of time. Another technique for speeding up delivery of RAW files is to lock focus and exposure before we begin RAW streaming, thereby opting-out of automatic focus and automatic exposure. A downside of this approach is that it can hinder otherwise desired use of auto-exposure and auto-focus. To address this situation, in some embodiments, RAW streaming is only engaged while the user is manually adjusting exposure. For example, where the device is a smart phone, RAW streaming can be engaged while the user is swiping up and down on an exposure dial made available by application 112; once the user releases their finger, RAW streaming can be disengaged, returning the system to auto-exposure and/or auto-focus (if each was respectively previously engaged). The device need not be a smart phone (or tablet) in order to make use of techniques described herein. Other types of devices that include cameras can also be used and techniques adapted as applicable. For example, where the device is instead a dedicated camera such as a digital single-lens reflex (DSLR), this technique can be implemented by engaging when the user adjusts an exposure control, and disengaging a brief period of time after the photographer stops adjusting the exposure.

An added benefit of a temporary-streaming approach is that battery consumption will be reduced. In an example implementation on commodity mobile devices (e.g., a currently available iPhone model), 22 RAW frames per second can be successfully captured using techniques described herein, with a latency as low as 50 milliseconds, without dropping frames, consuming excessive memory, or crashing.

2. RAW Processing

As each RAW image arrives (e.g., to application 112) the pixel buffer can be sent to the GPU for analysis using a General Purpose GPU programming platform. As an example, on Apple devices, Metal can be used. On Android devices or other environments, a similar platform such as Vulkan can be used. A program that runs on the GPU itself (also discussed above in more detail) is also referred to herein as a "compute shader." Shaders run massively in parallel and are optimized for realtime rendering. In some embodiments, the compute shader executes a naïve process to quickly demosaic the RAW image. One approach to performing this demosaicing is to treat the RAW image as a series of 2×2 tiles of color values. As mentioned above, the most common (Bayer) configuration uses (per tile) two green values, one red value, and one blue value. The 2×2 tile can be merged into a single RGB pixel. By combining the 2×2 tiles into a single output pixel, the image size is reduced by 75%, which is a significant performance improvement. Further, this approach reduces the noise in the image, allowing a noise reduction step to be skipped. And, at this lower resolution, there is no need to worry about edge artifacts. While the lower resolution image may be undesirable as a final photograph, its quality is sufficient for the purpose of realtime feedback (e.g., in a histogram) before capture. In an example implementation, the two green values are averaged together, thus: Color=(Green1+Green2)/2+ Red+Blue.

Another consideration is what transfer function should be used during output. This is dependent on the type of analysis, and its goals. In a first example, suppose that the goal is to tell the user how much of the sensor data is clipped. In this case, the transfer function is irrelevant, as that information is conveyed in the first and last buckets of a histogram.

In a second example, suppose that the goal is to learn the distribution of brightness values in the photo. When possible, a photographer wishes to avoid having too many values on the left side, as that implies much of the image is in darkness (under exposed). Brightening these areas of an image, later, in an image editor, amplifies noise. It is preferable for a photographer to instead expose correctly at the time of capture. In this scenario, to clearly communicate how much of the image data sits near the noise floor, use of a transfer function could also be omitted.

An example scenario in which a transfer function could be advisable is when rendering values in the viewfinder. Typical RAW image data contains values in a higher dynamic range than can be reproduced by most displays. Merely displaying linear values on-screen would look incorrect, if not illegible. In this scenario, a global tone mapping operator, such as the Drago Operator, can be used to fit data into a lower dynamic display in a perceptually acceptable way.

In some embodiments, quantization is optimized. Consider how a 12-bit data conveys 4096 possible values, and therefore requires 4096 columns in a histogram. Most mobile devices cannot fit a span of 4096 pixels. As an example, a popular range of iPhones (iPhone 6, 7, and 8) have a resolution of 1334×750. The iPhone 12 Pro Max has a resolution of 2778×1284. In practice, a 256 column histogram is granular enough to communicate important details to a photographer. Image data can be quantized to 8-bits, significantly reducing memory usage. Assuming that a 12-bit value is (likely) represented in 16-bit half float, by quantizing to 8-bit, memory usage is cut in half. Further, in a given RAW file, sensor values typically have an acceptable range. As an example, while a file potentially supports 16,000 values, a given sensor may only provide usable values in the range 512-12,000. In various embodiments, application 112 is configured to determine the white level and black level of the sensor. One approach to obtaining the values is to use a natively provided API (if made available by device 102). Another approach is for application 112 to take a sample RAW "canary" image and examine corresponding exif data to determine white/black levels for the sensor and use the information to determine an acceptable range.

3. Example Process

Figure 15:
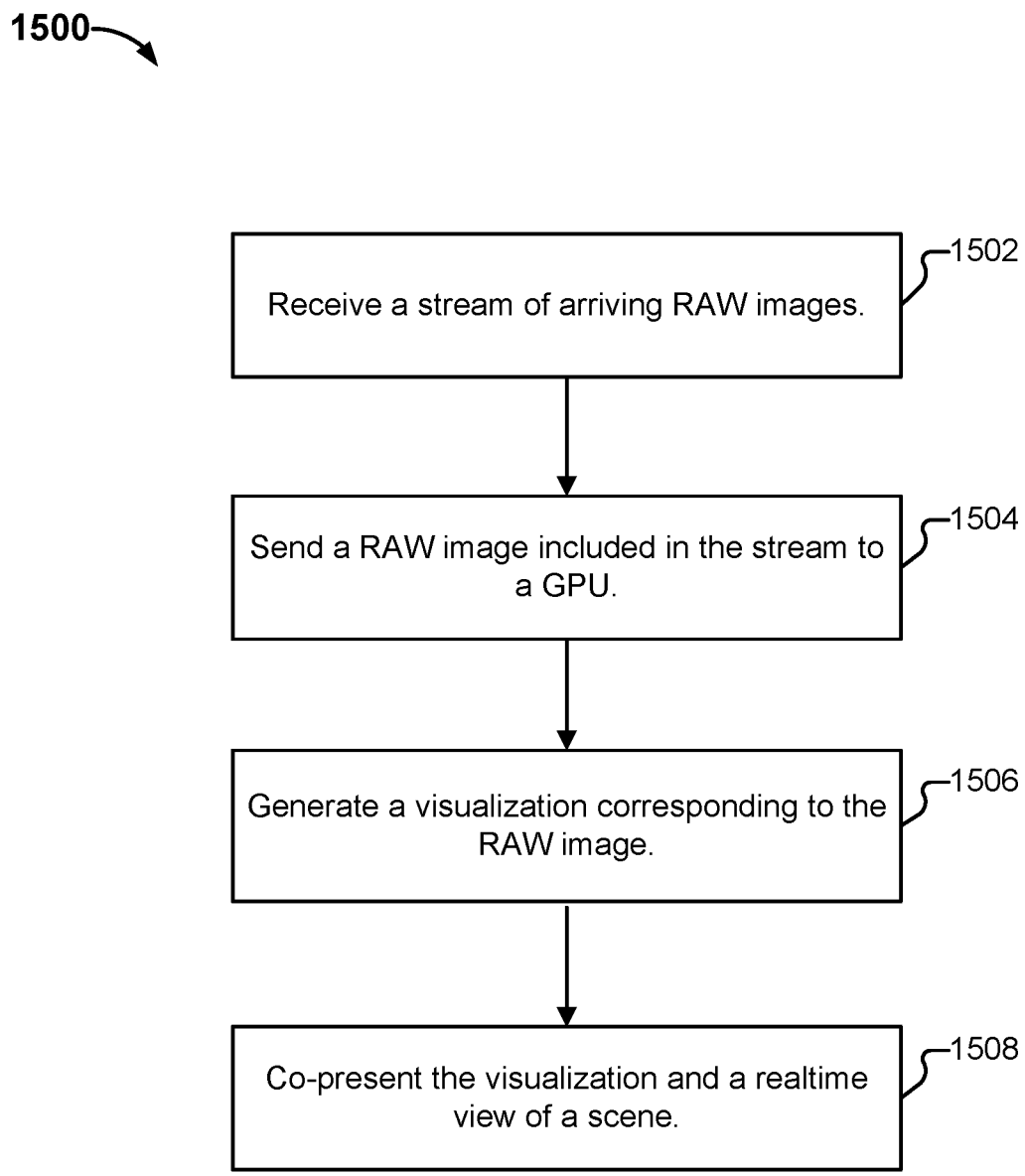
FIG. 15 illustrates an example of a process for analyzing image data and providing feedback in realtime.

FIG. 15 illustrates an example of a process for analyzing image data and providing feedback in realtime. In various embodiments, process 1500 is performed by mobile device 102. The process begins at 1502 when a stream of arriving RAW images is received. As mentioned above, such a stream can be received in a variety of ways. In a first example, if available, a native API can be used to receive RAW data. As a second example, a timer can be used to request RAW captures at a rate sustainable by the system (e.g., device 102) which are then received at 1502.

At 1504, a given raw image included in the stream received at 1502 is sent to a GPU for analysis. As mentioned above, a compute shader (executed on the GPU) demosaics the received RAW image if applicable. Certain RAW formats (e.g., linear RAW/ProRAW) may not need demosaicing by the GPU. As applicable, a transfer function can also be used. As explained above, in some cases use of a transfer function can be omitted (e.g., scenarios involving the visualization of under/over exposure).

At 1506, a visualization corresponding to the RAW image is generated (e.g., a histogram) and co-presented with a realtime view of a scene at 1508. Such visualizations can be generated using the RAW data, and, as applicable, can be generated using downsampled data, as explained in more detail below.

Figure 16A:
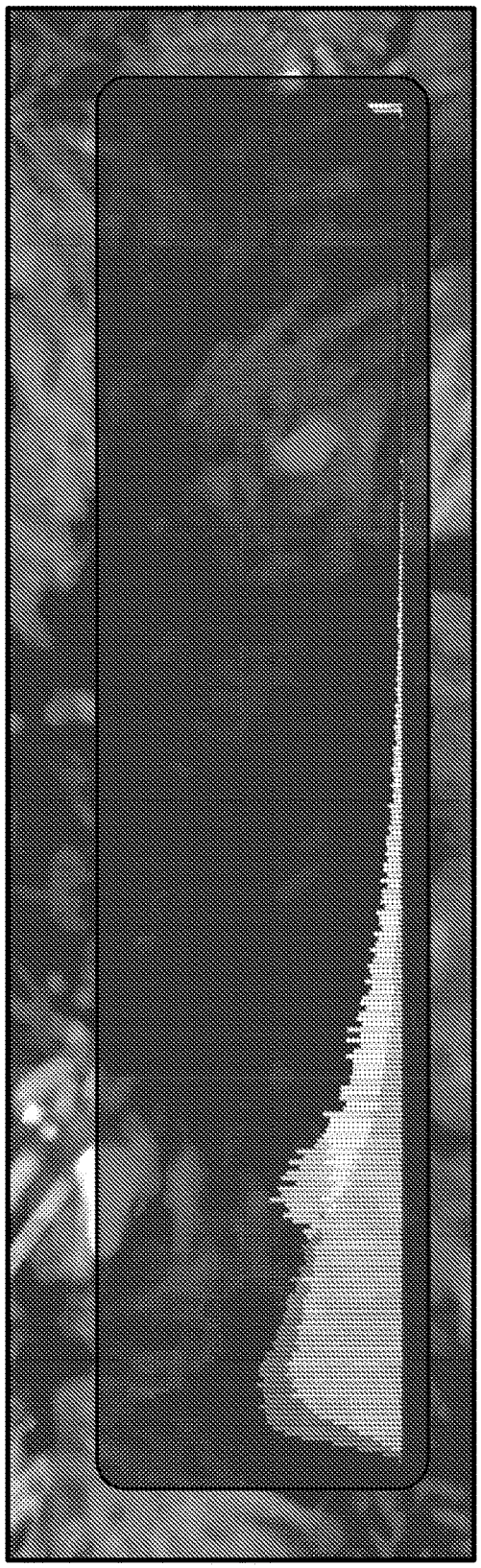
FIGS. 16A and 16B illustrate examples of histograms.
Figure 16B:
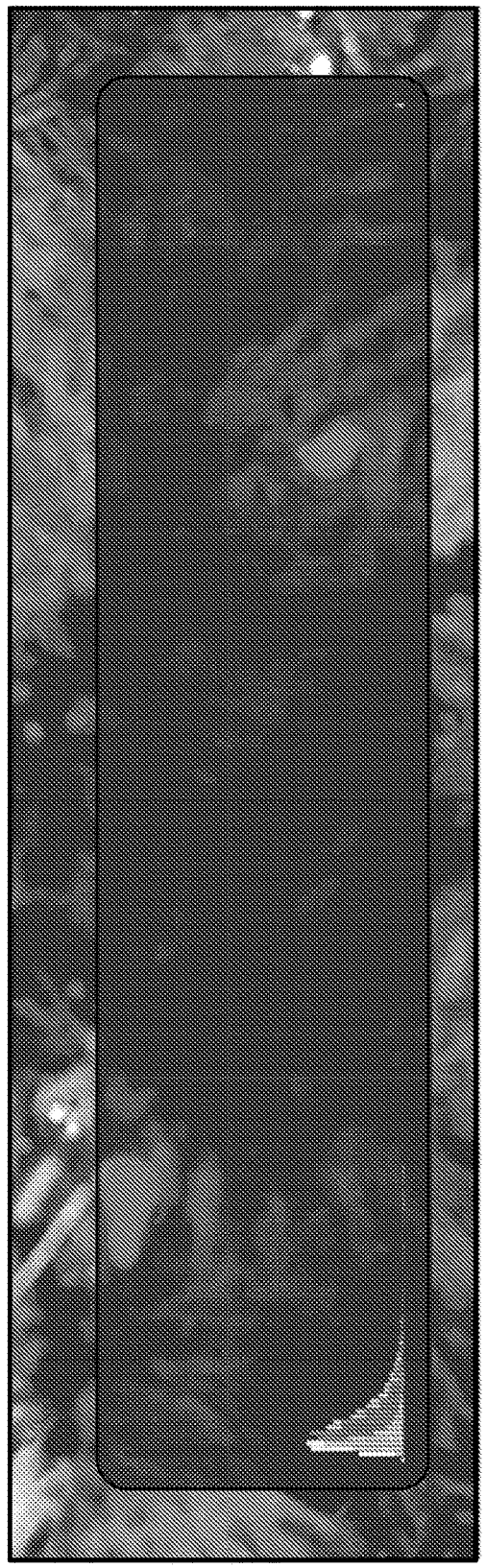
Figure 17A:
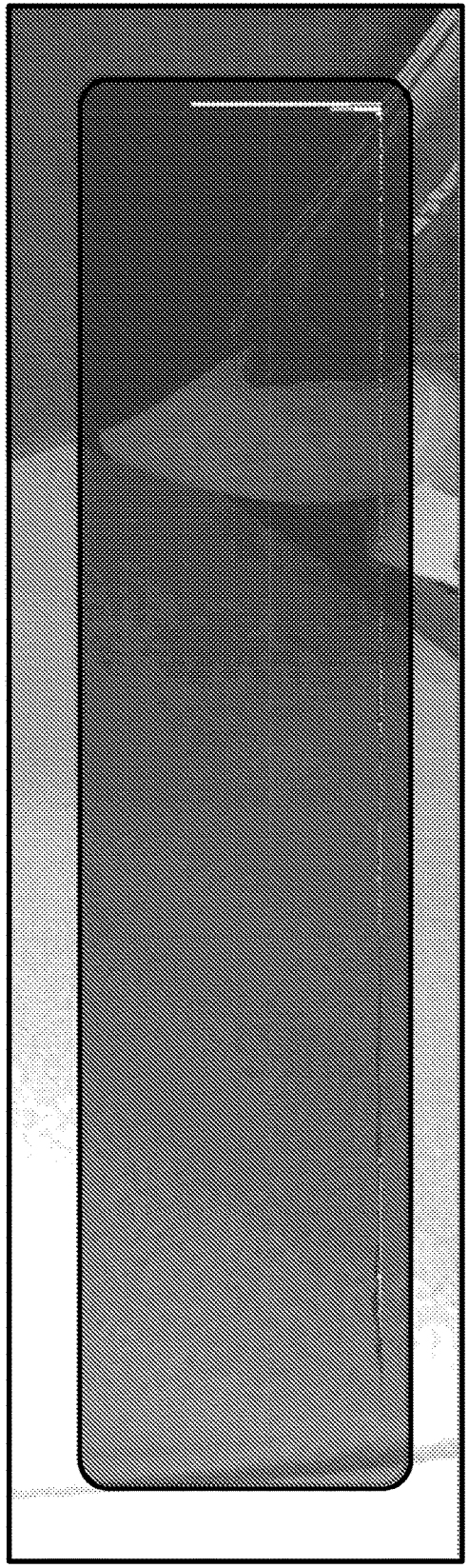
FIGS. 17A and 17B illustrate examples of histograms.
Figure 17B:
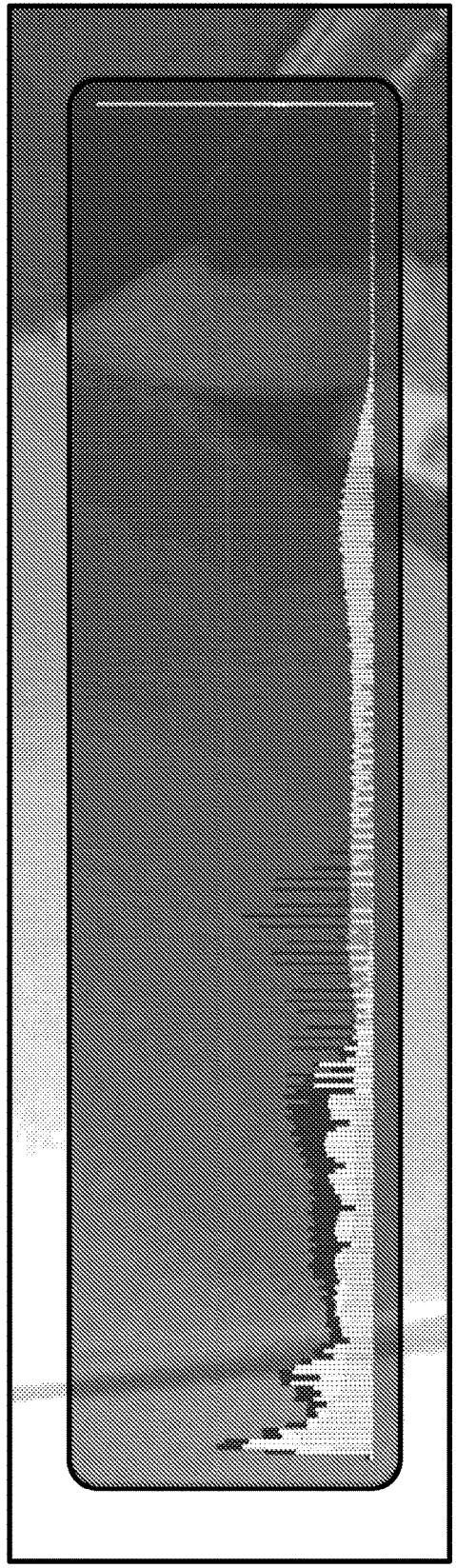

FIGS. 16A and 16B illustrate examples of histograms, overlayed on a scene. In FIG. 16A the histogram has been generated using a processed image. Based on the histogram depicted in FIG. 16A, it appears that a captured RAW image will contain a nice, even distribution of values. The histogram depicted in FIG. 16B was generated in accordance with techniques described herein, using RAW data. It reveals that the histogram depicted in FIG. 16A is incorrect and the scene, if captured, will contain values heavily biased toward shadows (meaning there is a significant amount of headroom available in the file to continue exposing). FIGS. 17A and 17B also illustrate examples of histograms, overlayed on a scene. In FIG. 17A the histogram has been generated using a processed image. Based on the histogram depicted in FIG. 17A, it appears that a captured RAW image will have most of its data clipped. The histogram depicted in FIG. 17B was generated in accordance with techniques described herein, using RAW data. It reveals that the histogram depicted in FIG. 17A is incorrect. In particular, while the green channel is clipped, there is a good distribution in the shadows and midtones.

The techniques described herein can be used for a variety of common tools used by photographers and videographers, including luminance histograms, color histograms, color waveforms, and zebra stripes. The techniques can also be used beyond the scope of exposure related tools. For example, tools such as focus peaking help a photographer find focus by highlighting the sharpest edges of an image. In such a scenario, each individual color channel can be analyzed for such edges, without demosaicing, which may affect edge contrast. Additionally, processed images involve conforming pixel values to a specific colorspace. The most popular colorspace in use today, sRGB, only covers a fraction of the colors present in the human visual system. Even the latest colorspaces found on the best monitors (e.g., BT.2020) still do not encompass all colors in the human visual system. Techniques described herein can be used for chromaticity calibration (e.g., with a practical application in white-balancing). As an example, when an image of a flower with a rich magenta is being captured, the viewfinder presented representation of the scene may make it appear that the colors are completely saturated. Through realtime analysis of the RAW data in accordance with techniques described herein, however, the photographer can be informed that seemingly oversaturated portions of the image have more information available during subsequent editing of the RAW file in an editing application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, in response to a user interaction indicative of the user's desire to use a visualization tool, a stream comprising a plurality of arriving RAW images;
send a RAW image included in the stream to a graphics processing unit (GPU);
use a result of the GPU to generate a visualization corresponding to the RAW image; and
co-present the visualization and a realtime view of a scene in a display; and
a memory communication interface coupled to the processor and configured to provide the processor with instructions.

2. The system of claim 1, wherein the visualization tool is a luminance histogram.

3. The system of claim 1, wherein the visualization tool is a color histogram.

4. The system of claim 1, wherein the visualization tool is a color waveform.

5. The system of claim 1, wherein the visualization tool depicts one or more zebra stripes.

6. The system of claim 1, wherein the visualization tool depicts focus peaking.

7. The system of claim 1, wherein the processor is further configured to generate the visualization at least in part by performing a downsampling.

8. A method, comprising:
receiving, in response to a user interaction indicative of the user's desire to use a visualization tool, a stream comprising a plurality of arriving RAW images;
sending a RAW image included in the stream to a graphics processing unit (GPU);
using a result of the GPU to generate a visualization corresponding to the RAW image; and
co-presenting the visualization and a realtime view of a scene in a display.

9. The method of claim 8, wherein the visualization tool is a luminance histogram.

10. The method of claim 8, wherein the visualization tool is a color histogram.

11. The method of claim 8, wherein the visualization tool is a color waveform.

12. The method of claim 8, wherein the visualization tool depicts one or more zebra stripes.

13. The method of claim 8, wherein the visualization tool depicts focus peaking.

14. A computer program product embodied in a non-transitory tangible computer readable storage medium and comprising computer instructions for:
receiving, in response to a user interaction indicative of the user's desire to use a visualization tool, a stream comprising a plurality of arriving RAW images;
sending a RAW image included in the stream to a graphics processing unit (GPU);
using a result of the GPU to generate a visualization corresponding to the RAW image; and
co-presenting the visualization and a realtime view of a scene in a display.

15. A system, comprising:
a processor configured to:
lock focus before receiving a stream comprising a plurality of arriving RAW images;
receive the stream comprising the plurality of arriving RAW images;
send a RAW image included in the stream to a graphics processing unit (GPU);
use a result of the GPU to generate a visualization corresponding to the RAW image; and
co-present the visualization and a realtime view of a scene in a display; and
a memory communication interface coupled to the processor and configured to provide the processor with instructions.

16. A system, comprising:
a processor configured to:
receive a stream comprising a plurality of arriving RAW images;
send a RAW image included in the stream to a graphics processing unit (GPU);
determine whether a user is manually adjusting exposure;
use a result of the GPU to generate a visualization corresponding to the RAW image; and
co-present the visualization and a realtime view of a scene in a display; and
a memory communication interface coupled to the processor and configured to provide the processor with instructions.

17. A system, comprising:
a processor configured to:
lock exposure before receiving a stream comprising a plurality of arriving RAW images;
receive the stream comprising the plurality of arriving RAW images;
send a RAW image included in the stream to a graphics processing unit (GPU);
use a result of the GPU to generate a visualization corresponding to the RAW image; and
co-present the visualization and a realtime view of a scene in a display; and
a memory communication interface coupled to the processor and configured to provide the processor with instructions.

18. A method, comprising:
locking focus before receiving a stream comprising a plurality of arriving RAW images;
receiving the stream comprising the plurality of arriving RAW images;
sending a RAW image included in the stream to a graphics processing unit (GPU);
using a result of the GPU to generate a visualization corresponding to the RAW image; and co-presenting the visualization and a realtime view of a scene in a display.

19. A method, comprising:
receiving a stream comprising a plurality of arriving RAW images;
sending a RAW image included in the stream to a graphics processing unit (GPU);
determining whether a user is manually adjusting exposure;
using a result of the GPU to generate a visualization corresponding to the RAW image; and
co-presenting the visualization and a realtime view of a scene in a display.

20. A method, comprising:
locking exposure before receiving a stream comprising a plurality of arriving RAW images;
receiving the stream comprising the plurality of arriving RAW images;
sending a RAW image included in the stream to a graphics processing unit (GPU);
using a result of the GPU to generate a visualization corresponding to the RAW image; and
co-presenting the visualization and a realtime view of a scene in a display.

21. A system, comprising:
a processor configured to:
  receive a stream comprising a plurality of arriving RAW images;
  send a RAW image included in the stream to a graphics processing unit (GPU), wherein the GPU is configured to demosaic the RAW image and wherein the GPU is further configured to determine whether a transfer function should be used during output;
  use a result of the GPU to generate a visualization corresponding to the RAW image; and
  co-present the visualization and a realtime view of a scene in a display; and
a memory communication interface coupled to the processor and configured to provide the processor with instructions.

22. The system of claim 21, wherein the determination is based at least in part on a type of the visualization.

23. A method, comprising:
receiving a stream comprising a plurality of arriving RAW images;
sending a RAW image included in the stream to a graphics processing unit (GPU), wherein the GPU is configured to demosaic the RAW image and wherein the GPU is further configured to determine whether a transfer function should be used during output;
using a result of the GPU to generate a visualization corresponding to the RAW image; and
co-presenting the visualization and a realtime view of a scene in a display.

24. The method of claim 23, wherein the determination is based at least in part on a type of the visualization.

25. The method of claim 8, wherein the processor is further configured to generate the visualization at least in part by performing a downsampling.

* * * * *